United States Patent
Sato et al.

(10) Patent No.: US 11,303,415 B2
(45) Date of Patent: Apr. 12, 2022

(54) WIRELESS COMMUNICATION DEVICE, WIRELESS COMMUNICATION METHOD, AND WIRELESS COMMUNICATION SYSTEM

(71) Applicant: SONY CORPORATION, Tokyo (JP)

(72) Inventors: Masanori Sato, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 16/633,735

(22) PCT Filed: Jun. 8, 2018

(86) PCT No.: PCT/JP2018/022014
§ 371 (c)(1),
(2) Date: Jan. 24, 2020

(87) PCT Pub. No.: WO2019/026421
PCT Pub. Date: Feb. 7, 2019

(65) Prior Publication Data
US 2020/0213062 A1    Jul. 2, 2020

(30) Foreign Application Priority Data
Aug. 4, 2017  (JP) .............................. JP2017-151705

(51) Int. Cl.
*H04L 5/00*     (2006.01)
*H04L 1/18*     (2006.01)
(Continued)

(52) U.S. Cl.
CPC .......... *H04L 5/0055* (2013.01); *H04L 1/1854* (2013.01); *H04L 1/1858* (2013.01);
(Continued)

(58) Field of Classification Search
CPC ...................................................... H04L 5/0055
See application file for complete search history.

(56) References Cited

U.S. PATENT DOCUMENTS

2007/0214495 A1    9/2007  Royer et al.
2007/0264936 A1*  11/2007  Kim ................... H04W 72/042
                                                    455/45

(Continued)

FOREIGN PATENT DOCUMENTS

CN    101379784 A    3/2009
CN    102187626 A    9/2011
(Continued)

OTHER PUBLICATIONS

International Search Report and Written Opinion of PCT Application No. PCT/JP2018/022014, dated Sep. 4, 2018, 09 pages of ISRWO.

*Primary Examiner* — Jason E Mattis
(74) *Attorney, Agent, or Firm* — Chip Law Group

(57) ABSTRACT

Provided is a wireless communication device including a reception controller that controls reception of a plurality of data frames provided by another device through repeated transmission, the plurality of data frames including the same data. The wireless communication device further includes a transmission controller that controls transmission of a confirmation response signal to the other device on a per-data frame basis, on a per-repeated transmission basis, or both.

16 Claims, 23 Drawing Sheets

(51) Int. Cl.
*H04W 52/02* (2009.01)
*H04W 72/04* (2009.01)

(52) U.S. Cl.
CPC ... *H04W 52/0216* (2013.01); *H04W 72/0446* (2013.01); *H04W 72/0453* (2013.01)

(56) References Cited

U.S. PATENT DOCUMENTS

| | | | |
|---|---|---|---|
| 2010/0106427 A1 | 4/2010 | Fukuma et al. | |
| 2012/0195250 A1 | 8/2012 | Jain et al. | |
| 2013/0155878 A1* | 6/2013 | Deng | H04L 1/1887 370/252 |
| 2014/0198678 A1* | 7/2014 | Kim | H04L 5/001 370/252 |
| 2017/0214495 A1* | 7/2017 | Golitschek Edler von Elbwart | H04L 1/1861 |
| 2018/0013522 A1* | 1/2018 | Liu | H04L 5/0055 |
| 2018/0070403 A1* | 3/2018 | Uemura | H04W 4/70 |
| 2019/0280828 A1* | 9/2019 | Zhou | H04L 47/6275 |

FOREIGN PATENT DOCUMENTS

| | | |
|---|---|---|
| CN | 103339892 A | 10/2013 |
| CN | 106664167 A | 5/2017 |
| CN | 107409420 A | 11/2017 |
| JP | 2009-165063 A | 7/2009 |
| JP | 2009-526431 A | 7/2009 |
| JP | 2010-537452 A | 12/2010 |
| JP | 2014-504840 A | 2/2014 |
| JP | 2017-527179 A | 9/2017 |
| KR | 10-2007-0080144 A | 8/2007 |
| KR | 10-2013-0116359 A | 10/2013 |
| TW | 200742317 A | 11/2007 |
| TW | 201240407 A | 10/2012 |
| WO | 2007/091815 A2 | 8/2007 |
| WO | 2011/010468 A1 | 1/2011 |
| WO | 2012/106440 A1 | 8/2012 |
| WO | 2016/015213 A1 | 2/2016 |
| WO | 2016/153025 A1 | 9/2016 |

* cited by examiner

[FIG. 1]
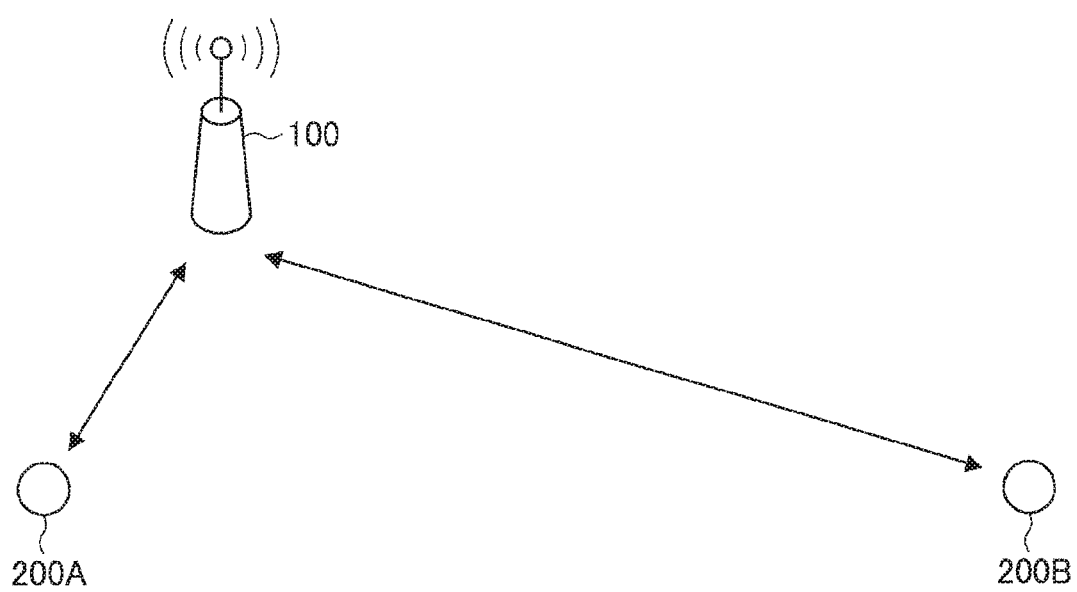

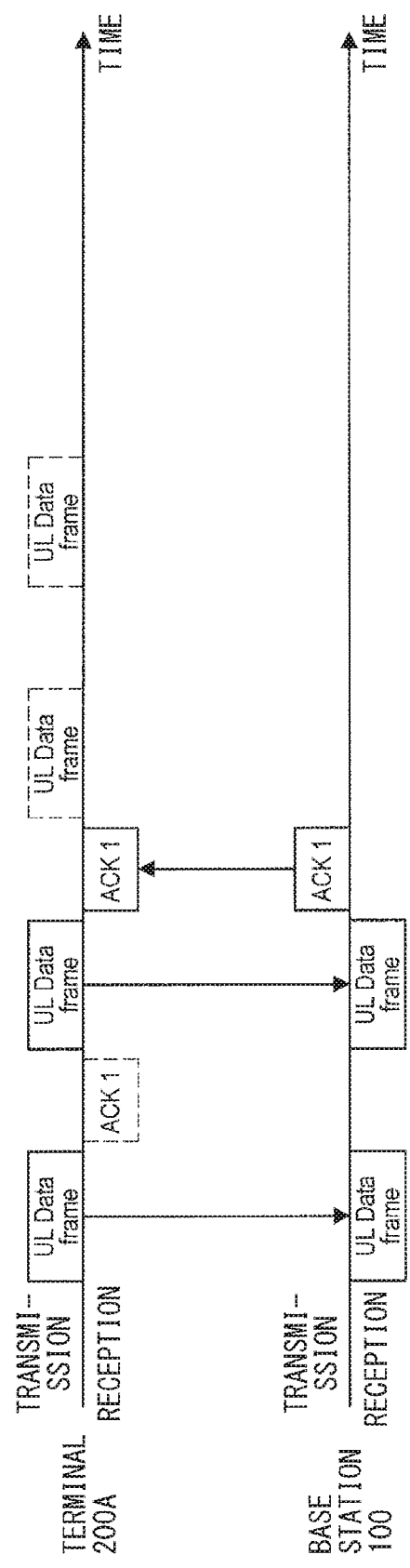
[FIG. 2]

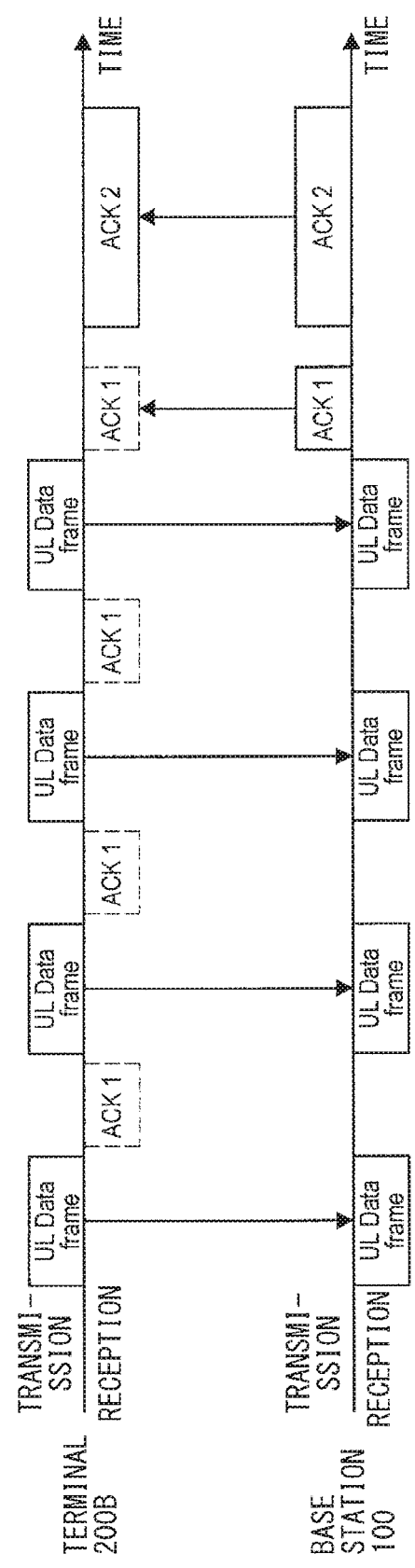
[FIG. 3]

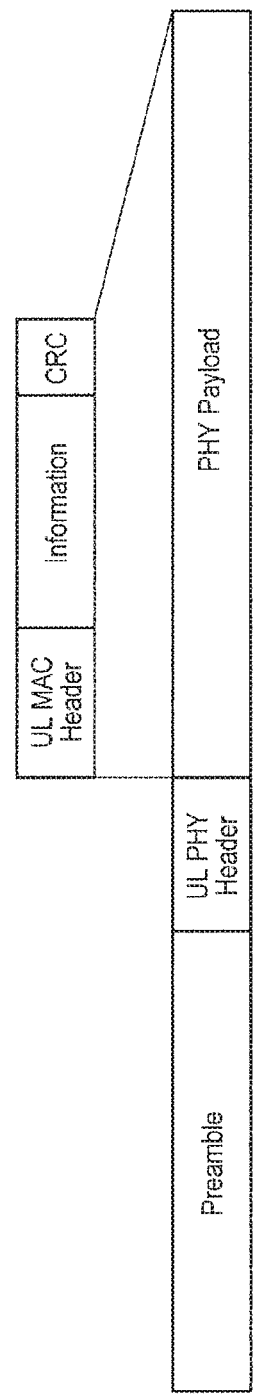
[FIG. 4]

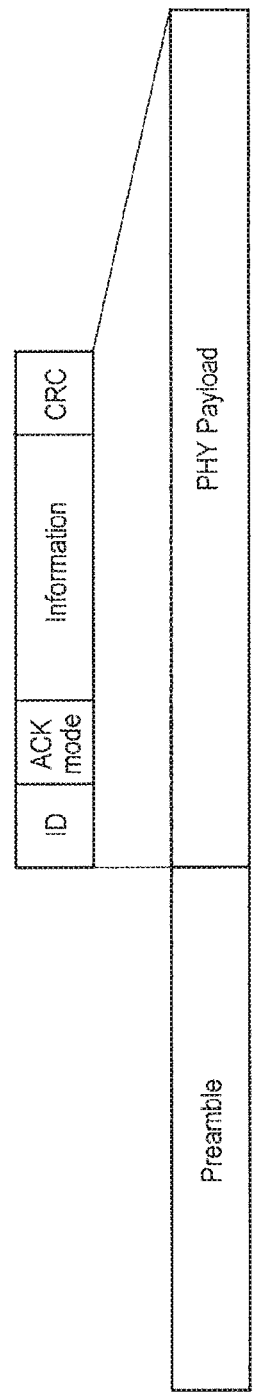
[FIG. 5]

[FIG. 6]
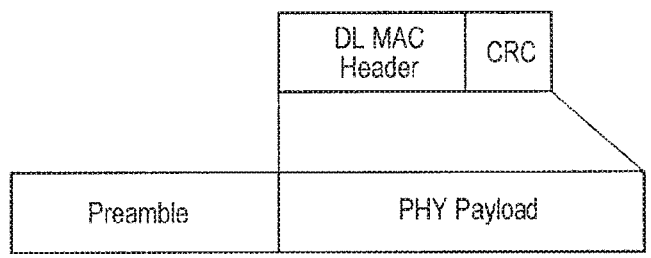
[FIG. 7]
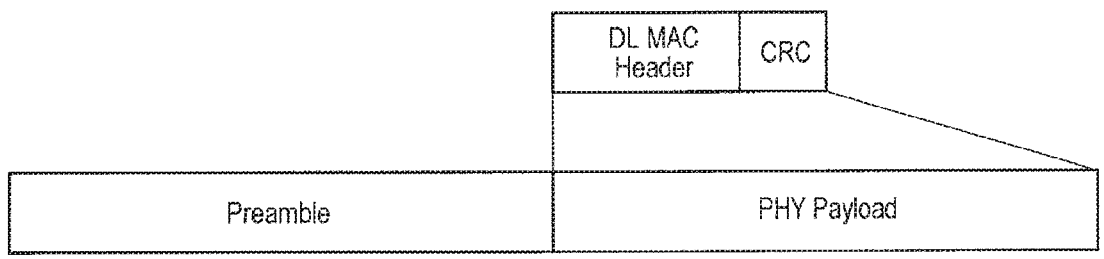

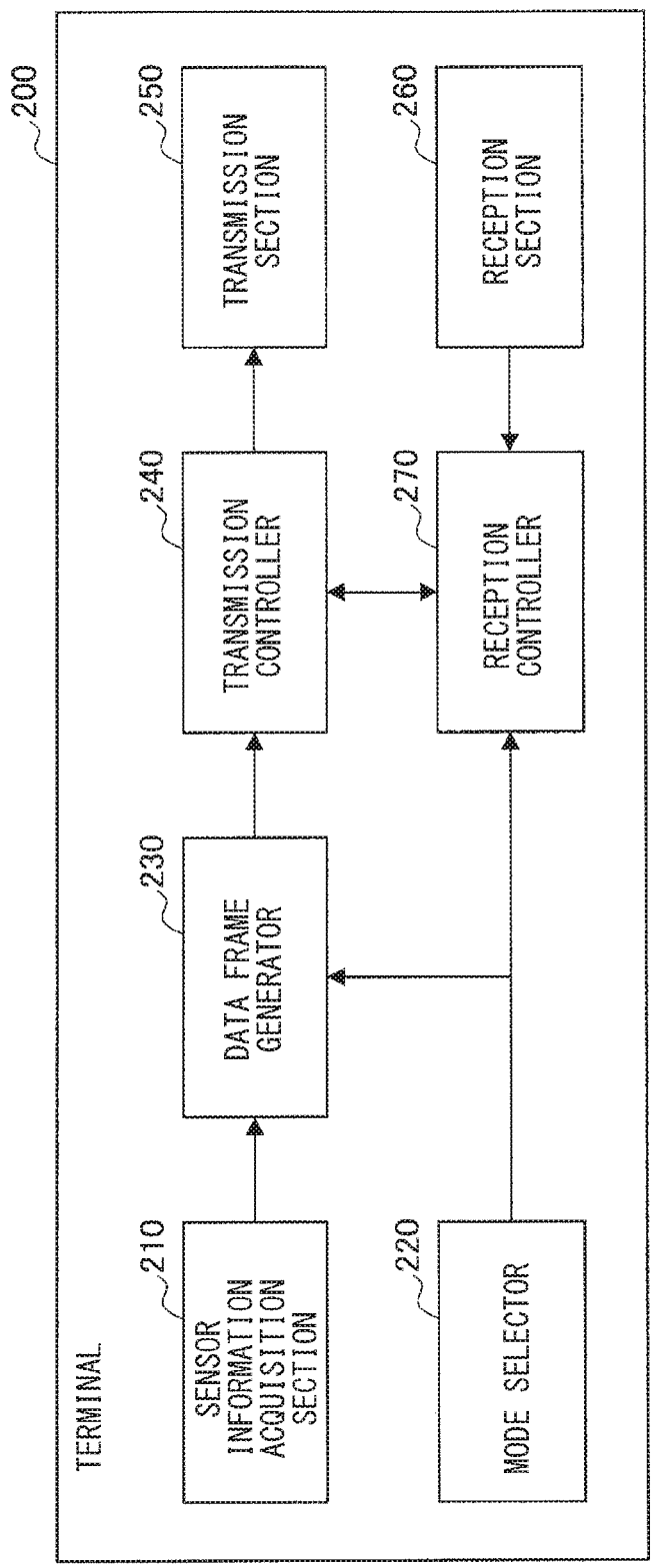
[FIG. 8]

[FIG. 9]

| MODE | QUANTIZED BIT |
|---|---|
| (A) RECEIVE NO ACK | 00 |
| (B) RECEIVE ONLY ACK 1 | 01 |
| (C) RECEIVE ONLY ACK 2 | 10 |
| (D) RECEIVE ACK 1 AND ACK 2 | 11 |

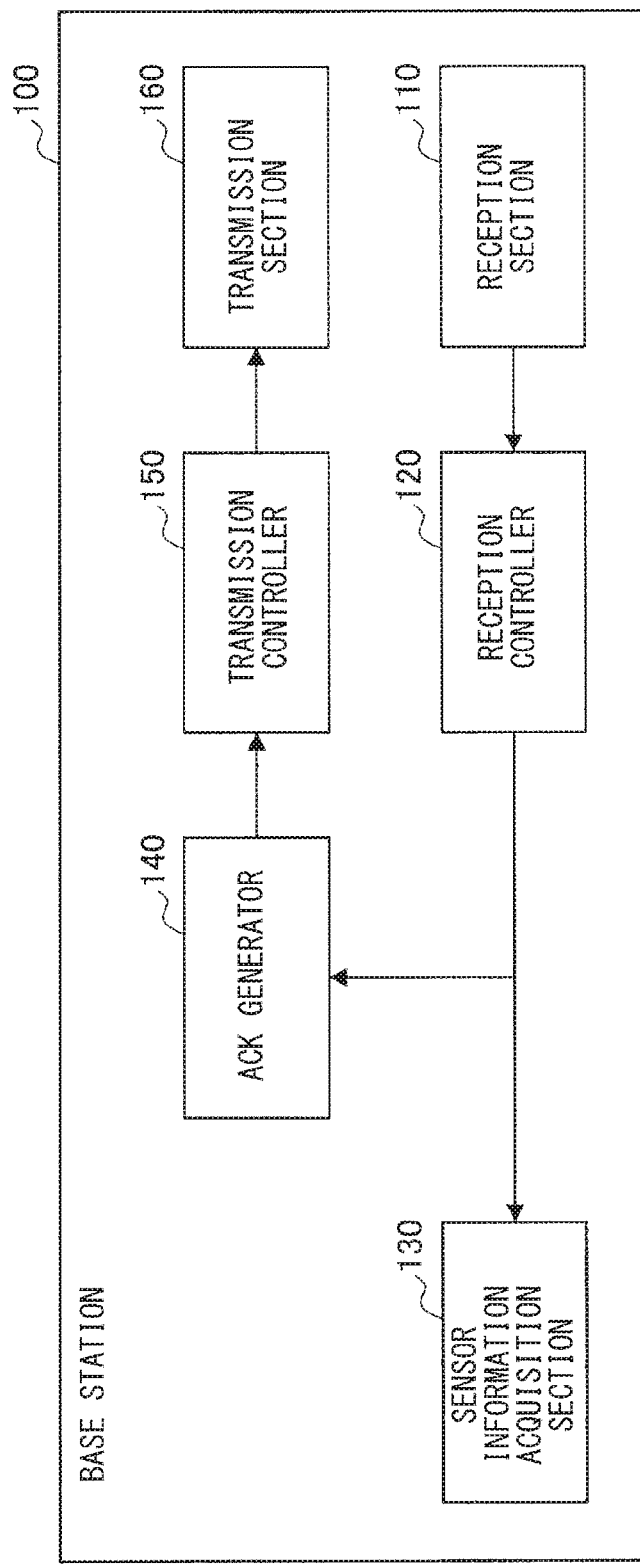
[FIG. 10]

[FIG. 11]
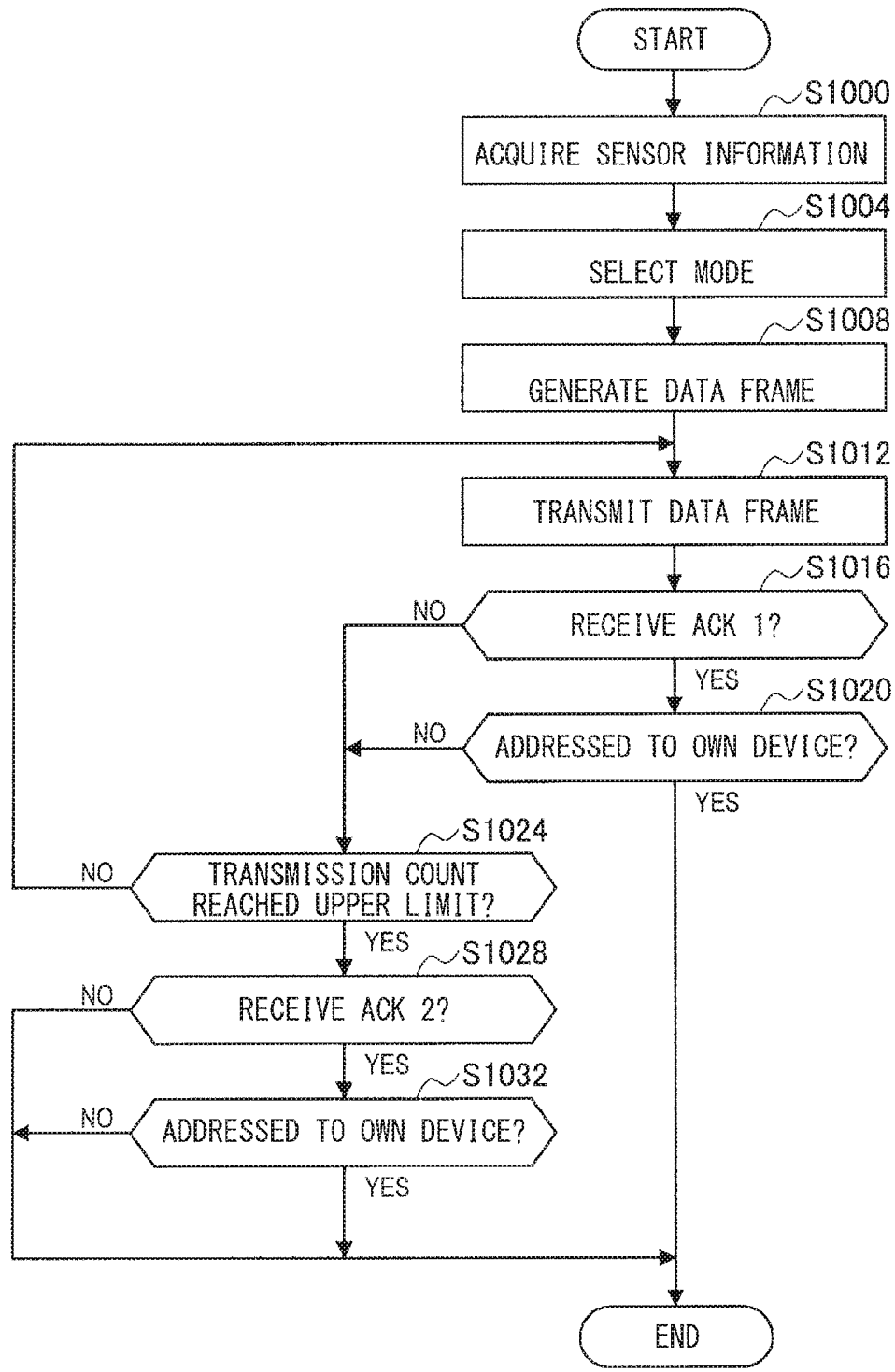

[FIG. 12]
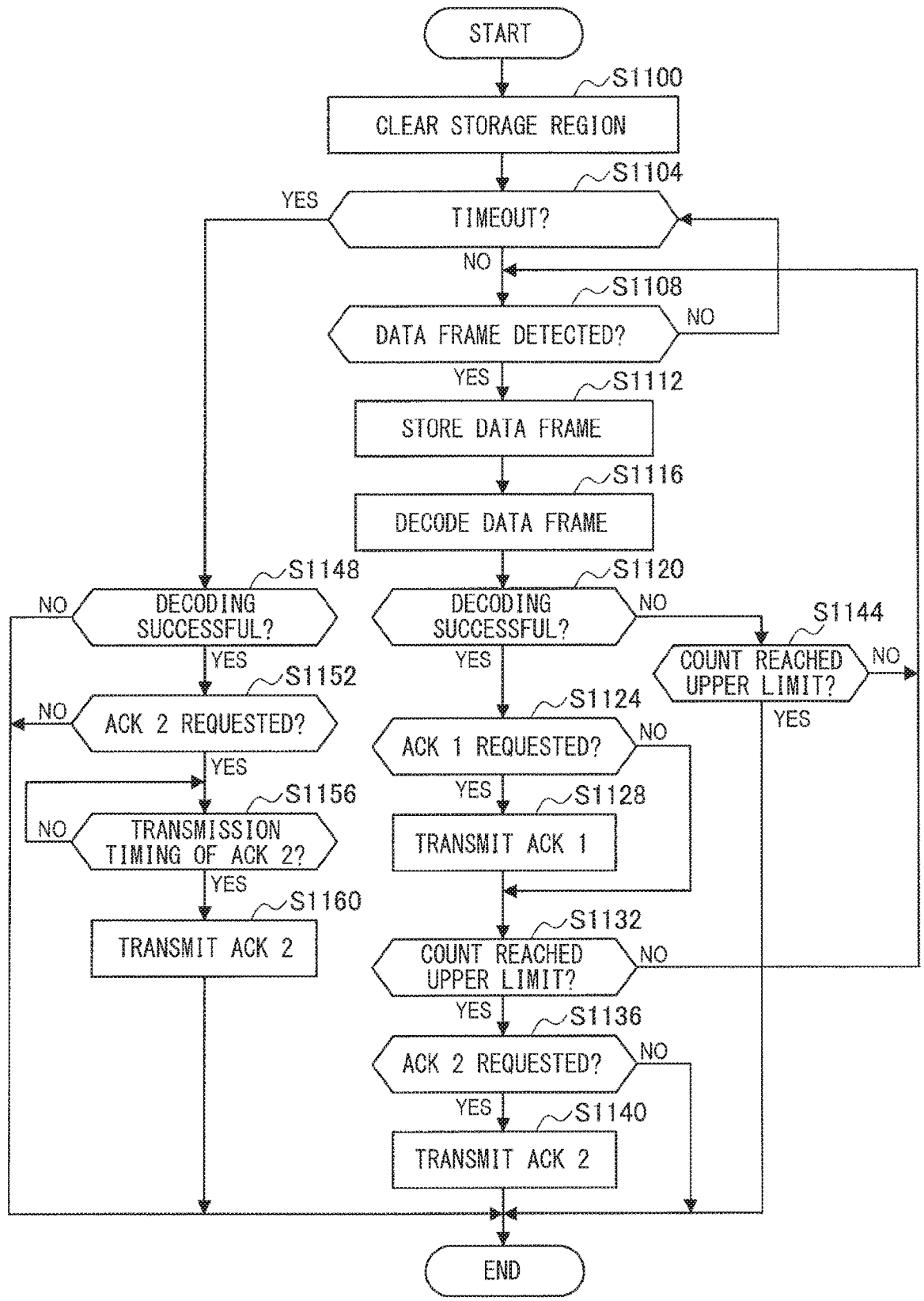

[FIG. 13]
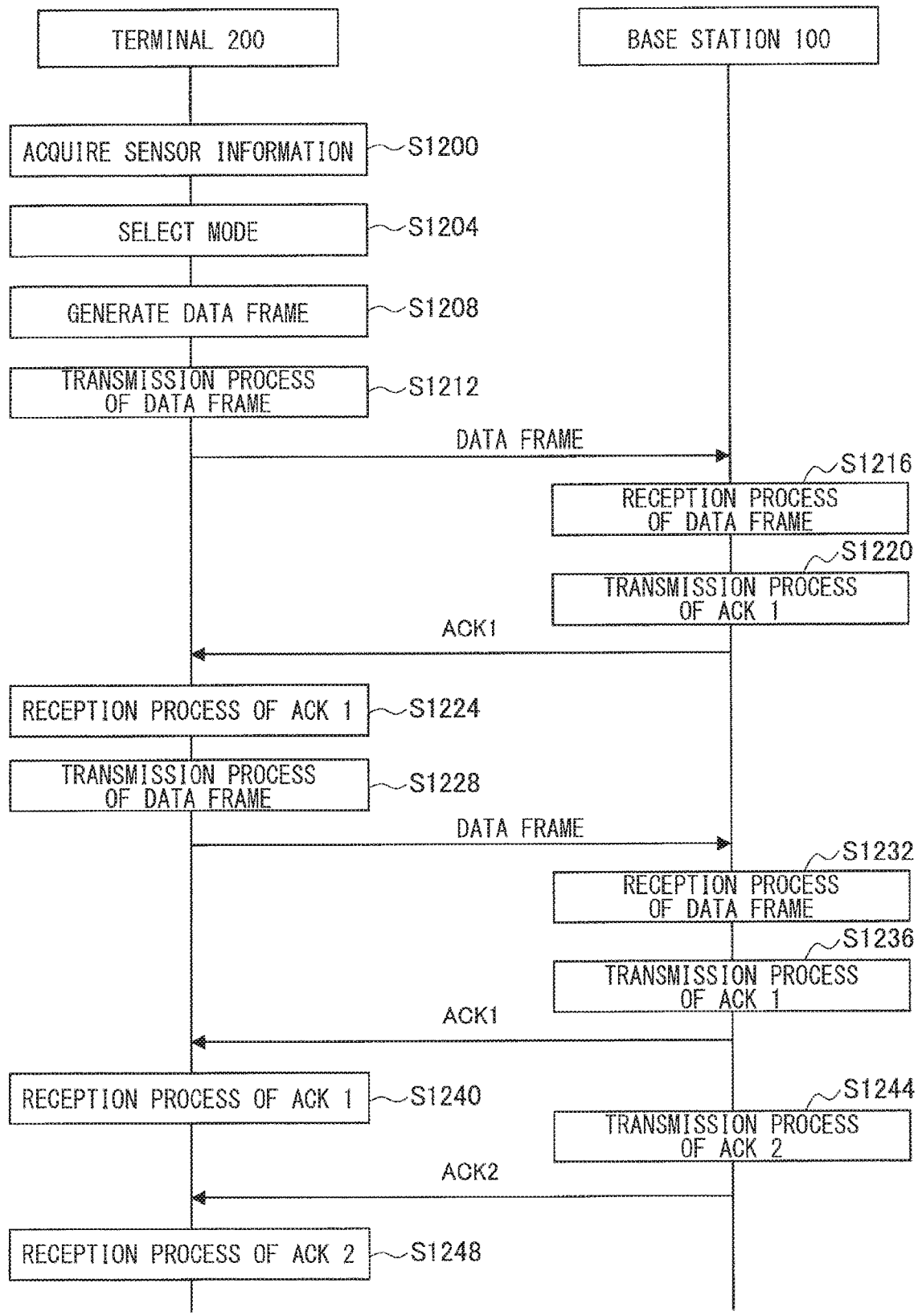

[FIG. 14]
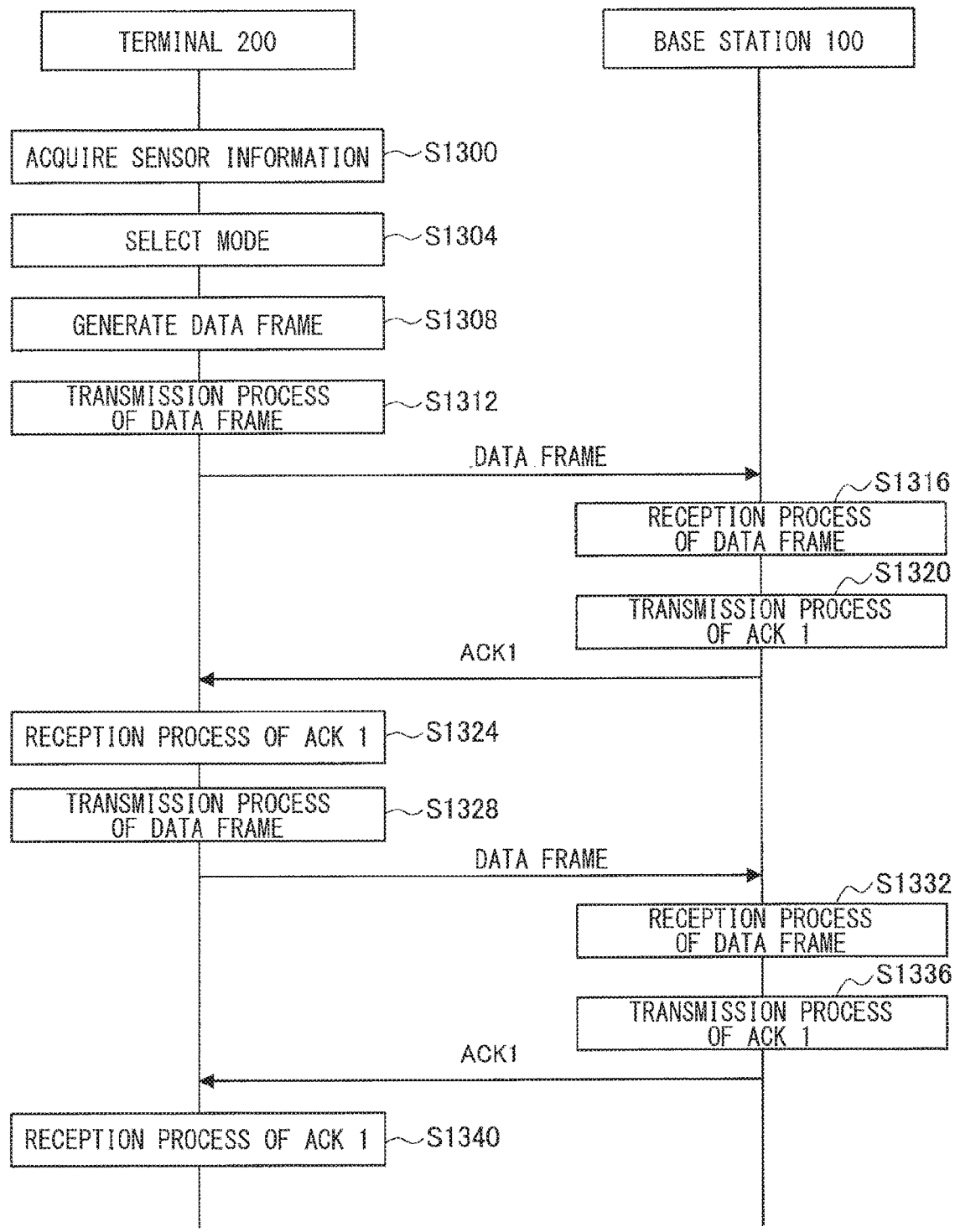

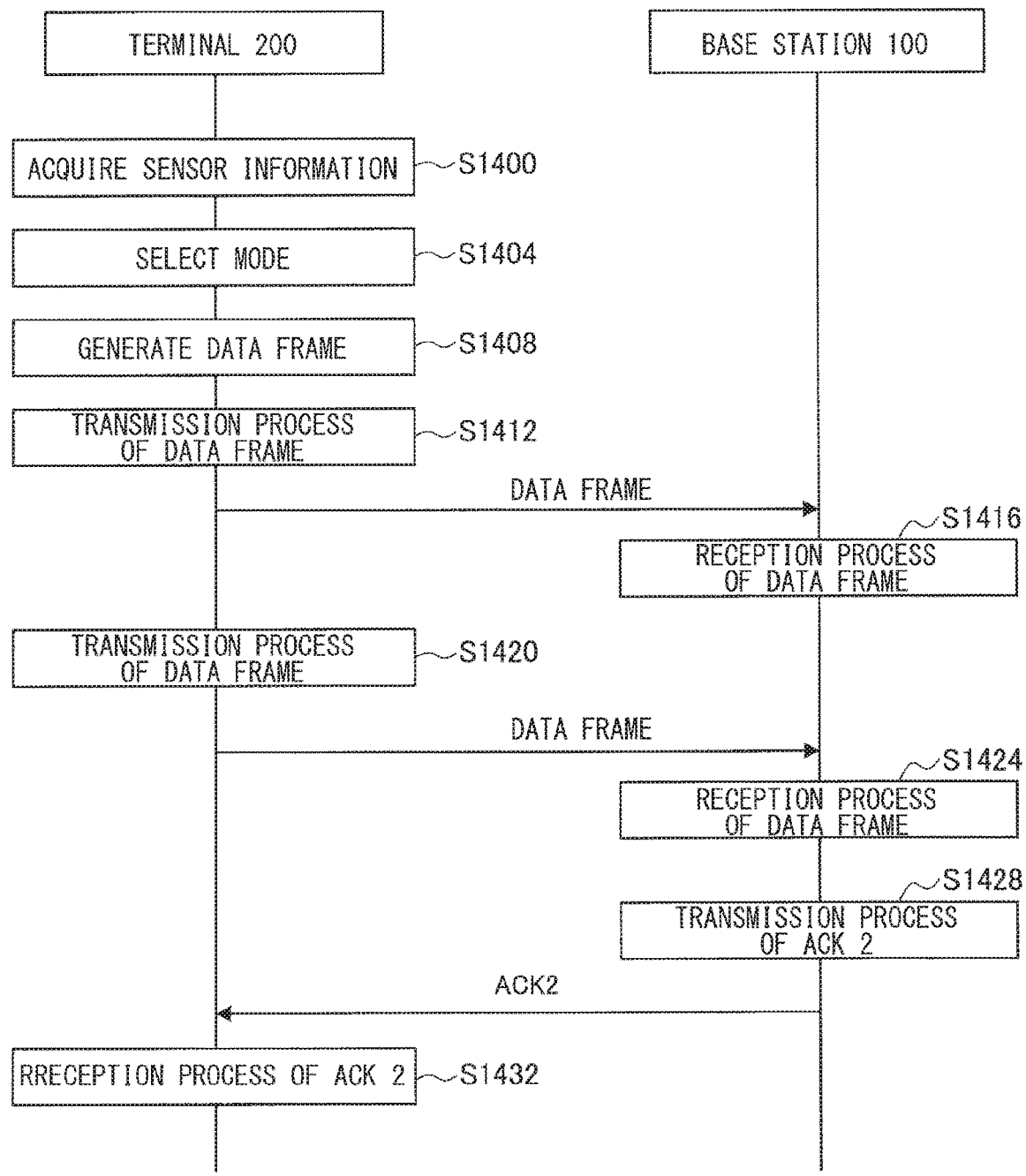
[FIG. 15]

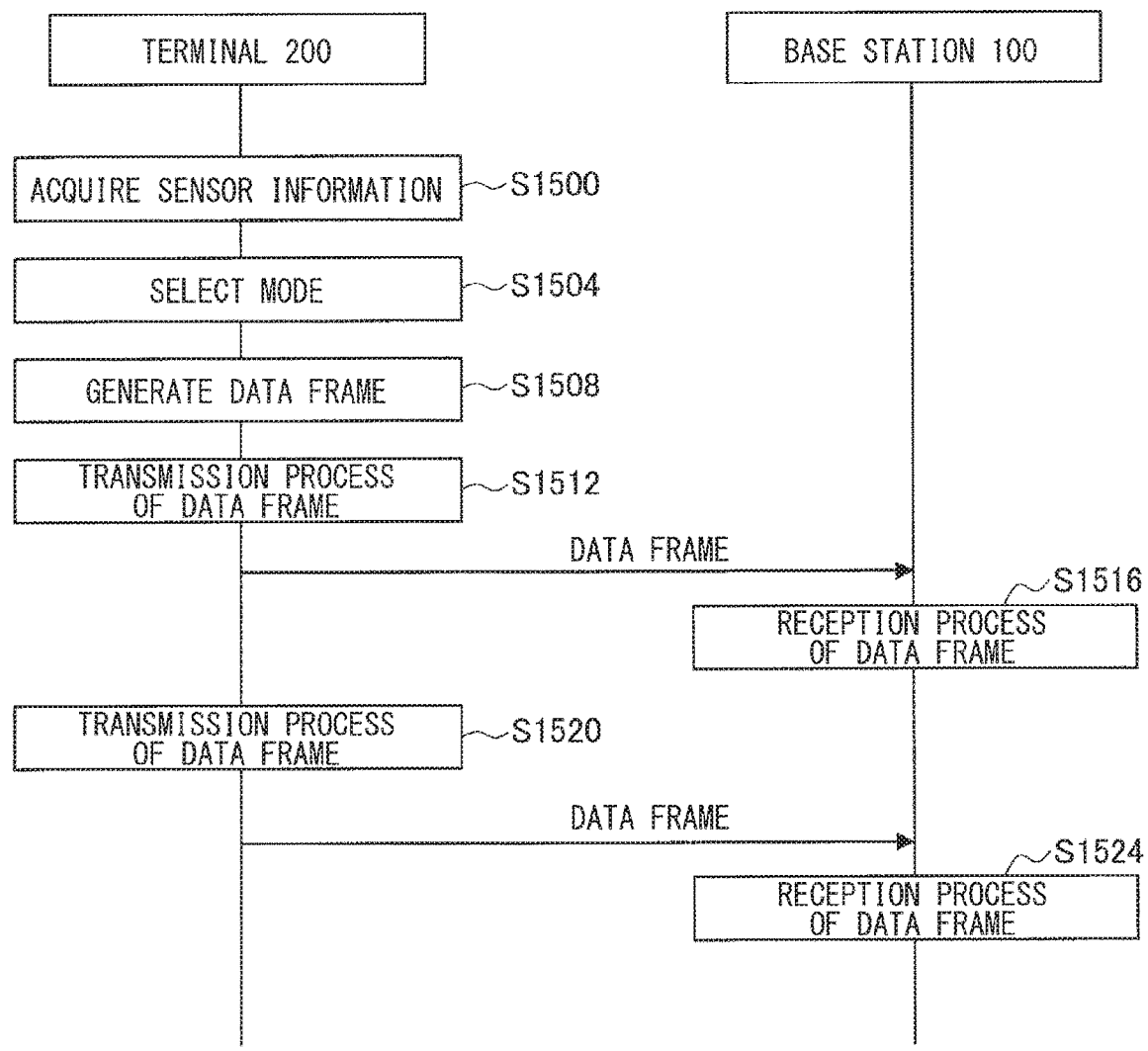
[FIG. 16]

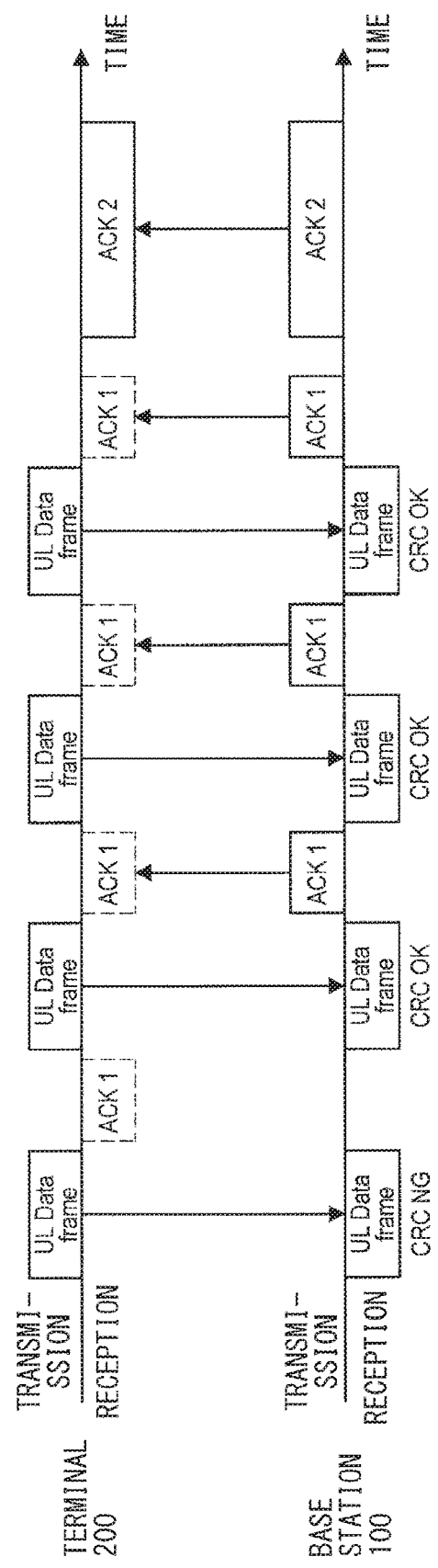
[FIG. 17]

[FIG. 18]
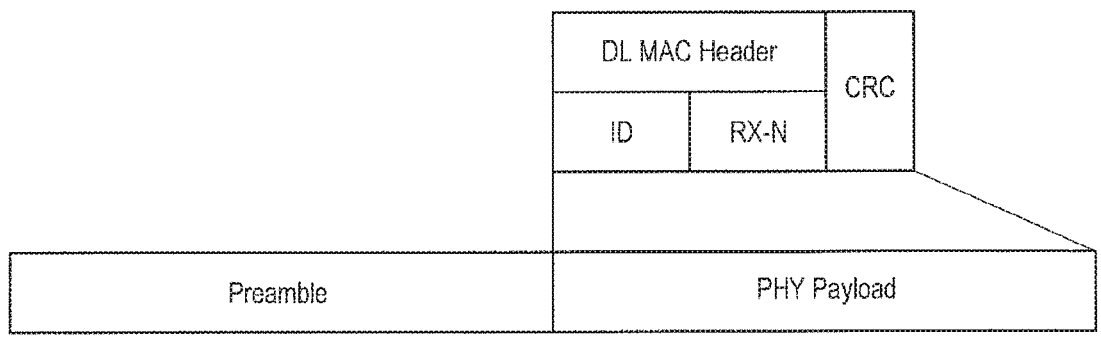

[FIG. 19]
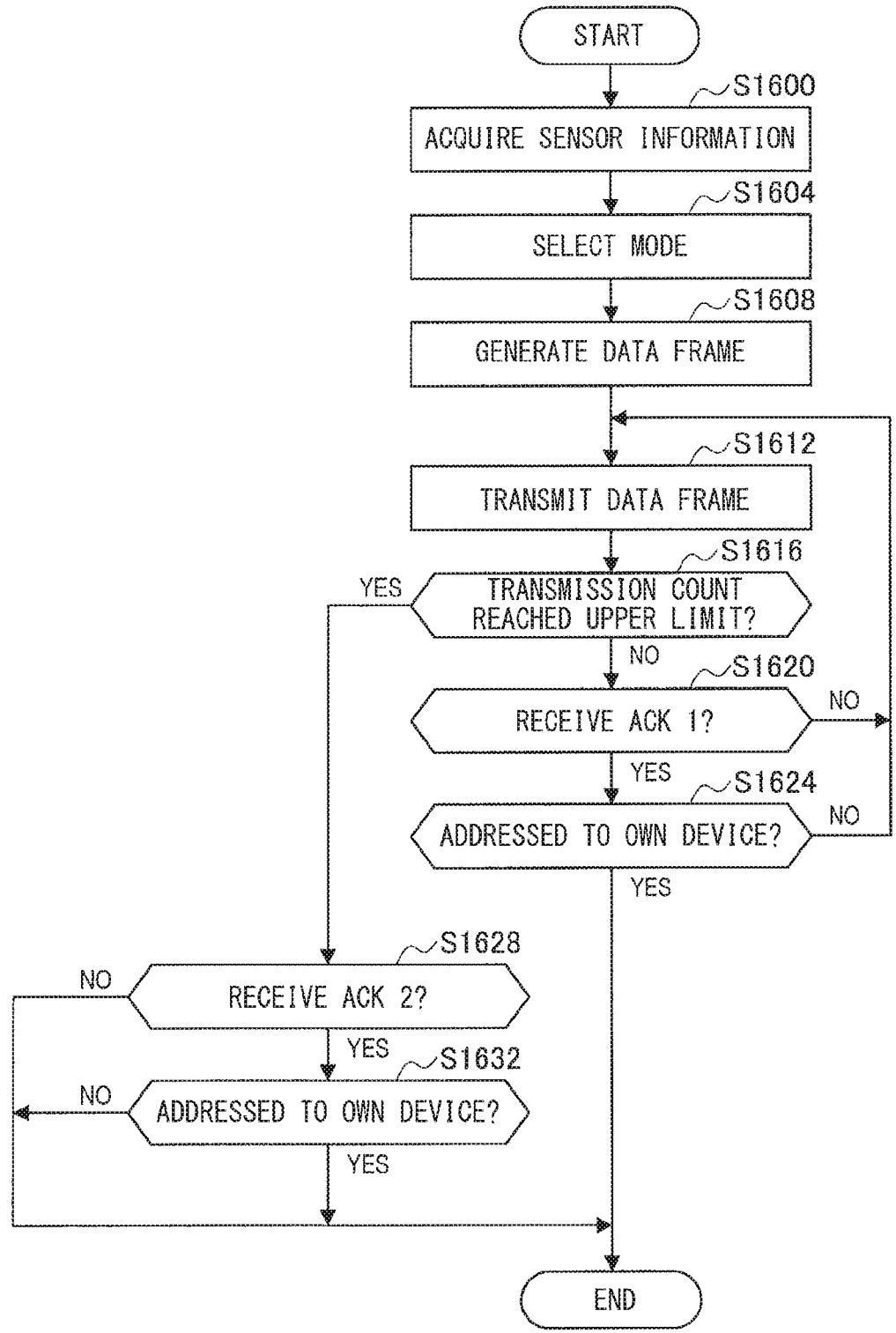

[FIG. 20]
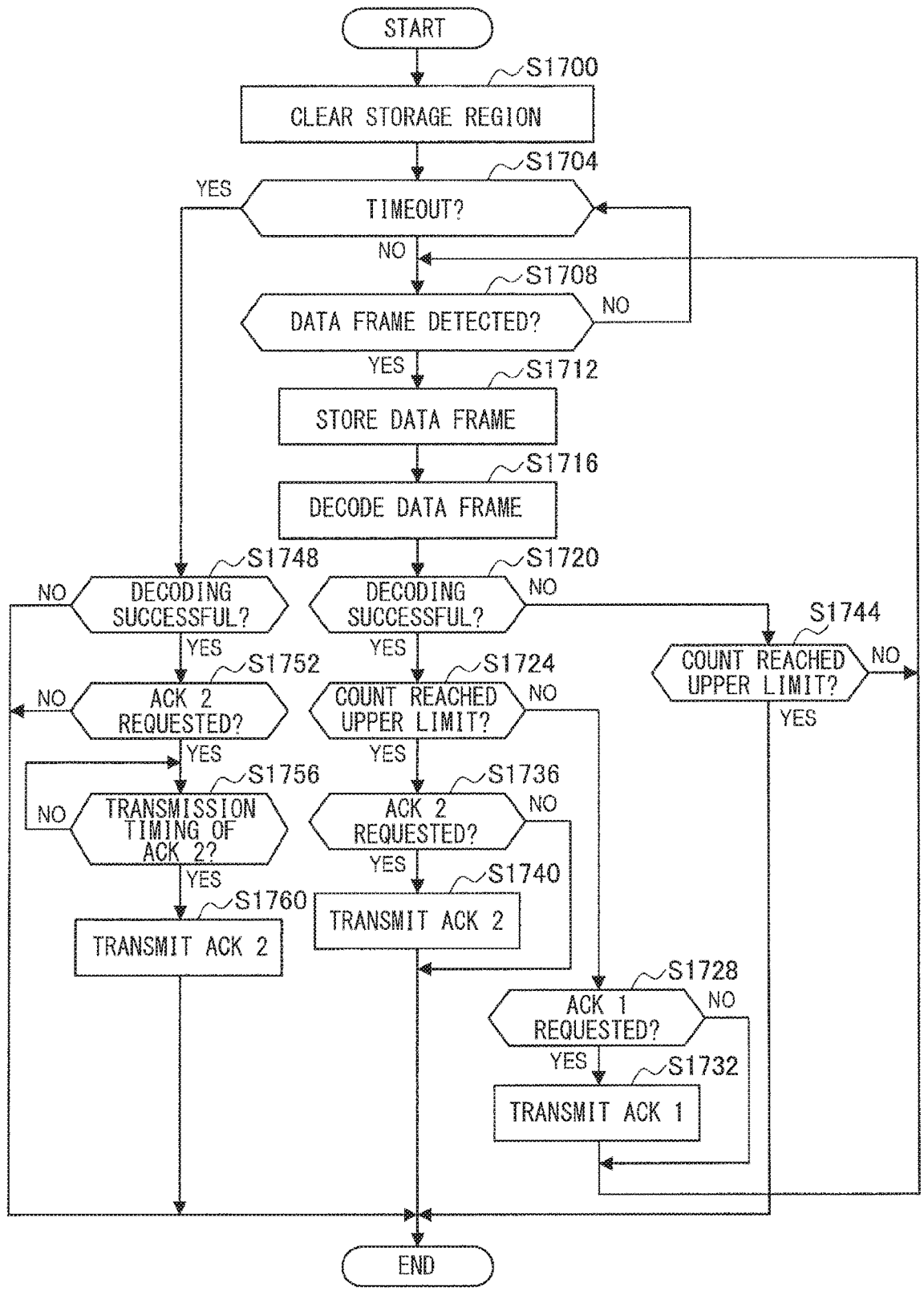

[FIG. 21]
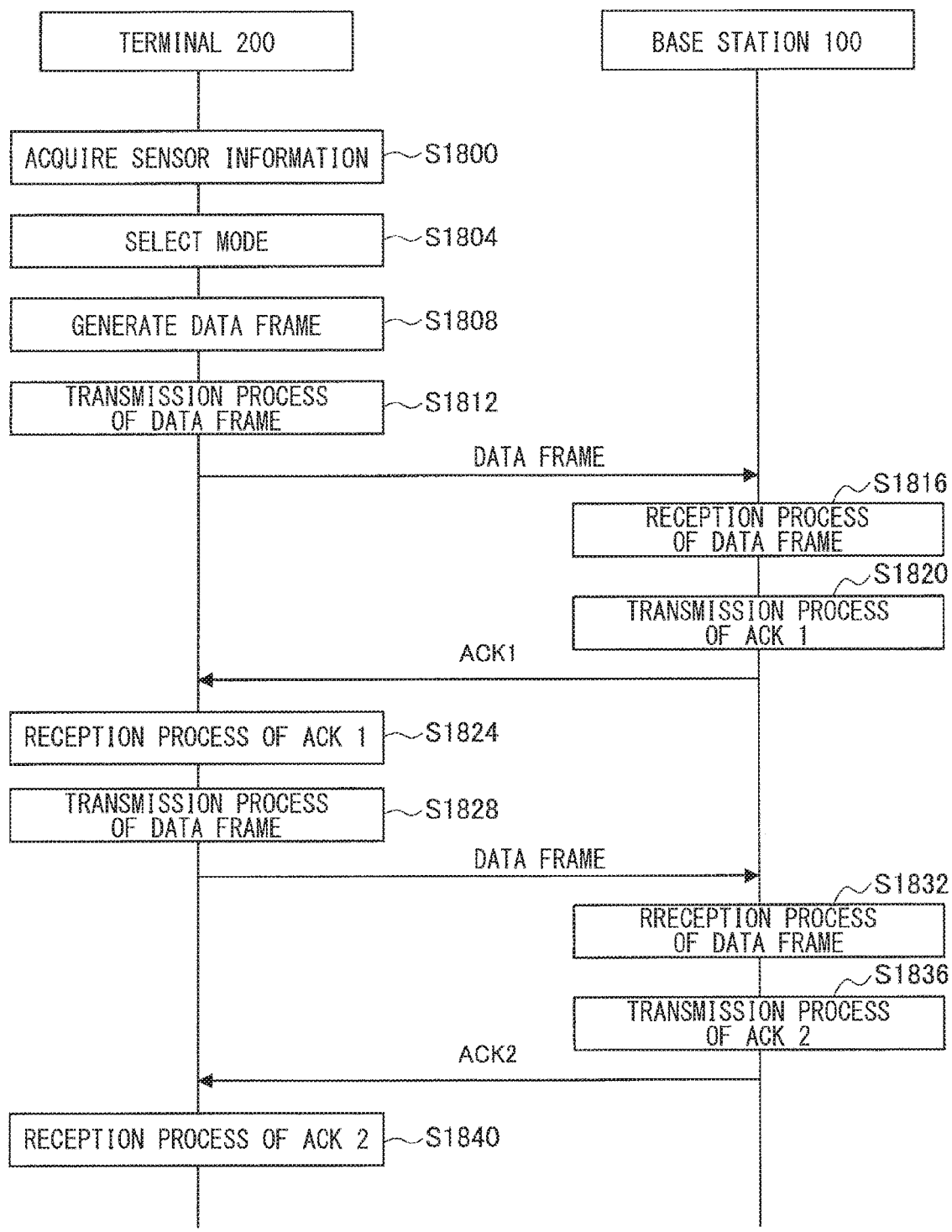

[FIG. 22]
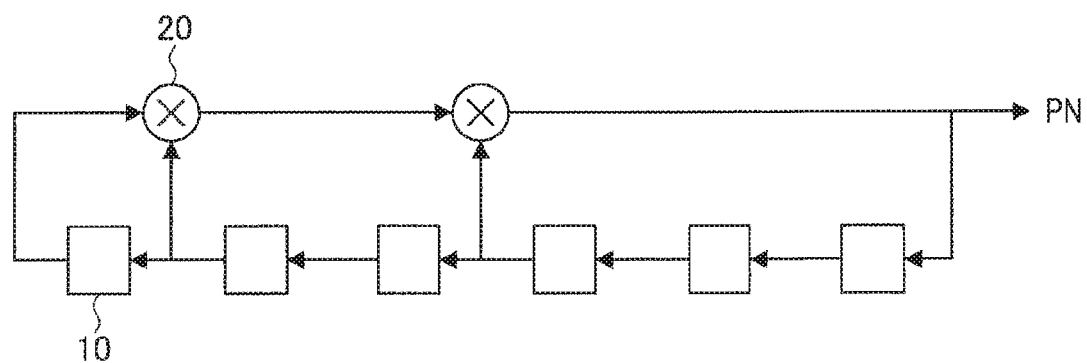
[FIG. 23]
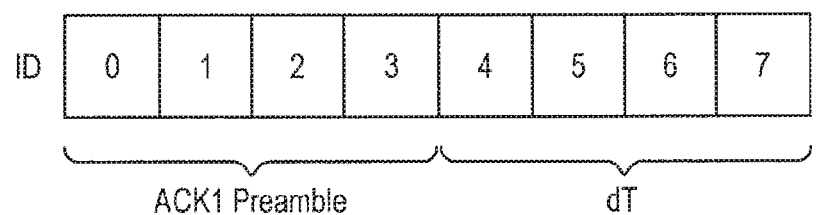

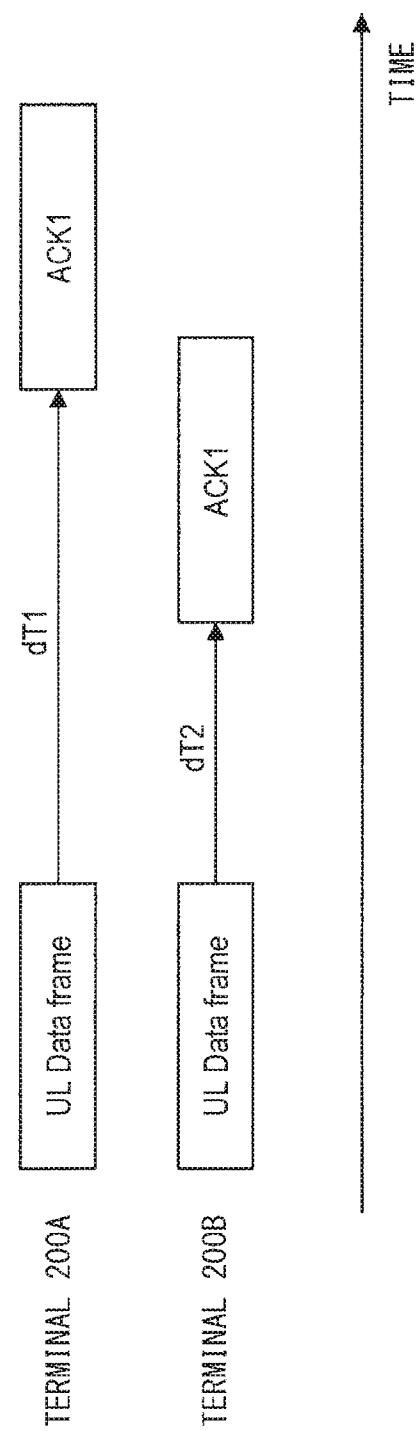
[FIG. 24]

[FIG. 25]

| FREQUENCY NUMBER:F_RX | FREQUENCY |
|---|---|
| 0 | 920.0MHz |
| 1 | 920.2MHz |
| 2 | 920.4MHz |
| ... | ... |

[FIG. 26]

| FREQUENCY NUMBER:F_TX | FREQUENCY |
|---|---|
| 0 | 820.0MHz |
| 1 | 820.2MHz |
| 2 | 820.4MHz |
| ... | ... |

WIRELESS COMMUNICATION DEVICE, WIRELESS COMMUNICATION METHOD, AND WIRELESS COMMUNICATION SYSTEM

CROSS REFERENCE TO RELATED APPLICATIONS

This application is a U.S. National Phase of International Patent Application No. PCT/JP2018/022014 filed on Jun. 8, 2018, which claims priority benefit of Japanese Patent Application No. JP 2017-151705 filed in the Japan Patent Office on Aug. 4, 2017. Each of the above-referenced applications is hereby incorporated herein by reference in its entirety.

TECHNICAL FIELD

The present disclosure relates to a wireless communication device, a wireless communication method, and a wireless communication system.

BACKGROUND ART

In a wireless communication system, various methods are usable for a source device that transmits a radio signal to obtain a result of whether or not data communication has been successful from a destination device to which the radio signal is transmitted. For example, the source device can obtain a result of whether or not data communication has been successful by receiving a confirmation response signal from the destination device. The confirmation response signal is for example, ACK (ACKnowledgement) indicating successful data communication, NACK (Negative ACKnowledgement) indicating unsuccessful data communication, or the like.

For example, PTL 1 listed below discloses a technique to perform communication control using ACK or NACK in order to minimize power consumption at a mobile station in 3GPP (Third Generation Partnership Project) LTE (Long Term Evolution).

CITATION LIST

Patent Literature

PLT 1: Japanese Unexamined Patent Application Publication (Published Japanese Translation of PCT Application) No. JP2010-537452

SUMMARY OF THE INVENTION

Problems to be Solved by the Invention

Note here that it has been difficult for disclosed techniques such as that of PTL 1 described above to achieve a reduction in power consumption by wireless communication devices, a reduction in impact of interference, and a reduction in the number of base stations at the same time. The present disclosure therefore provides a novel and improved wireless communication device, a novel and improved wireless communication method, and a novel and improved wireless communication system that are able to achieve a reduction in power consumption by wireless communication devices, a reduction in impact of interference, and a reduction in the number of base stations at the same time.

Means for Solving the Problems

The present disclosure provides a wireless communication device including: a reception controller that controls reception of a plurality of data frames provided by another device through repeated transmission, the plurality of data frames including the same data; and a transmission controller that controls transmission of a confirmation response signal to the other device on a per-data frame basis, on a per-repeated transmission basis, or both.

The present disclosure also provides a wireless communication method executed by a computer, the method including: controlling reception of a plurality of data frames provided by another device through repeated transmission, the plurality of data frames including the same data; and controlling transmission of a confirmation response signal to the other device on a per-data frame basis, on a per-repeated transmission basis, or both.

The present disclosure also provides a wireless communication device including: a transmission controller that controls repeated transmission for providing a plurality of data frames to another device, the plurality of data frames including the same data; and a reception controller that controls reception of a confirmation response signal from the other device on a per-data frame basis, on a per-repeated transmission basis, or both.

The present disclosure also provides a wireless communication method executed by a computer, the method including: controlling repeated transmission for providing a plurality of data frames to another device, the plurality of data frames including the same data; and controlling reception of a confirmation response signal from the other device on a per-data frame basis, on a per-repeated transmission basis, or both.

The present disclosure also provides a wireless communication system including: a first wireless communication device; and a second wireless communication device, the first wireless communication device including a first reception controller that controls reception of a plurality of data frames provided by the second wireless communication device through repeated transmission, the plurality of data frames including the same data, and a first transmission controller that controls transmission of a confirmation response signal to the second wireless communication device on a per-data frame basis, on a per-repeated transmission basis, or both, the second wireless communication device including a second transmission controller that controls the repeated transmission for providing the data frames to the first wireless communication device, and a second reception controller that controls reception of the confirmation response signal from the first wireless communication device on a per-data frame basis, on a per-repeated transmission basis, or both.

Effects of the Invention

According to the present disclosure, as described above, it is possible to achieve a reduction in power consumption by wireless communication devices, a reduction in impact of interference, and a reduction in the number of base stations at the same time.

It should be noted that the above-described effects are not necessarily limiting. Any of the effects indicated in this description or other effects that can be understood from this description may be exerted in addition to the above-described effects or in place of the above-described effects.

BRIEF DESCRIPTION OF DRAWING

FIG. 1 is a diagram illustrating an example of a device configuration of a wireless communication system.

FIG. 2 is a diagram illustrating an example of an operation of a base station and a terminal.

FIG. 3 is a diagram illustrating an example of an operation of the base station and a terminal.

FIG. 4 is a diagram illustrating an example of a frame configuration of a data frame generated by a terminal.

FIG. 5 is a diagram illustrating an example of the frame configuration of the data frame generated by the terminal.

FIG. 6 is a diagram illustrating an example of a frame configuration of an ACK 1 generated by the base station.

FIG. 7 is a diagram illustrating an example of a frame configuration of an ACK 2 generated by the base station.

FIG. 8 is a block diagram illustrating an example of a functional configuration of the terminal.

FIG. 9 is a diagram illustrating examples of ACK-related modes.

FIG. 10 is a block diagram illustrating an example of a functional configuration of the base station.

FIG. 11 is a flowchart illustrating an example of an operation of the terminal.

FIG. 12 is a flowchart illustrating an example of an operation of the base station.

FIG. 13 is a sequence diagram illustrating an example of an operation of the terminal and the base station in a case where ACKs 1 and an ACK 2 are communicated.

FIG. 14 is a sequence diagram illustrating an example of an operation of the terminal and the base station in a case where only ACKs 1 are communicated.

FIG. 15 is a sequence diagram illustrating an operation of the terminal and the base station in a case where only an ACK 2 is communicated.

FIG. 16 is a sequence diagram illustrating an example of an operation of the terminal and the base station in a case where neither an ACK 1 nor an ACK 2 is communicated.

FIG. 17 is a diagram explaining background of a third embodiment.

FIG. 18 is a diagram illustrating an example of a frame configuration of an ACK 2 including RX-N.

FIG. 19 is a flowchart illustrating an example of an operation of a terminal according to a fourth embodiment.

FIG. 20 is a flowchart illustrating an example of an operation of a base station according to the fourth embodiment.

FIG. 21 is a sequence diagram illustrating an example of an operation of the terminal and the base station according to the fourth embodiment.

FIG. 22 is a diagram illustrating an example of a PN sequence generator that is used in a fifth embodiment.

FIG. 23 is a diagram explaining a Preamble generation method and a transmission timing deciding method according to a modification example of the fifth embodiment.

FIG. 24 is a diagram explaining the Preamble generation method and the transmission timing deciding method according to the modification example of the fifth embodiment.

FIG. 25 is a diagram illustrating an example of correspondence between frequencies to be used for a reception process and frequency numbers according to a sixth embodiment.

FIG. 26 is a diagram illustrating an example of correspondence between frequencies to be used for a transmission process and frequency numbers according to the sixth embodiment.

MODES FOR CARRYING OUT THE INVENTION

The following describes preferred embodiments of the present disclosure in detail with reference to the accompanying drawings. It should be noted that in this description and the accompanying drawings, constituent elements that have substantially the same functional configuration are indicated by the same reference signs, and thus redundant description thereof is omitted.

It should be noted that the description is given in the following order.
1. First Embodiment
  1-1. Background
  1-2. Device Configuration
  1-3. Overview of Functions
  1-4. Frame Configuration
  1-5. Functional Configuration
  1-6. Mode Selection Method
  1-7. Operation
2. Second Embodiment
  2-1. Background
  2-2. Overview of Functions
  2-3. Functional Configuration and Operation
3. Third Embodiment
  3-1. Background
  3-2. Overview of Functions
  3-3. Functional Configuration
4. Fourth Embodiment
  4-1. Background
  4-2. Overview of Functions
  4-3. Functional Configuration and Operation
5. Fifth Embodiment
  5-1. Background
  5-2. Overview of Functions
  5-3. Functional Configuration
  5-4. Modification Example
6. Sixth Embodiment
  6-1. Background
  6-2. Overview of Functions
  6-3. Functional Configuration
7. Conclusion 1. First Embodiment First, the following describes a first embodiment of the present disclosure.
(1-1. Background)

In a wireless communication system, various methods are usable for a source device that transmits a radio signal to obtain a result of whether or not data communication has been successful from a destination device to which the radio signal is transmitted. For example, the source device can obtain a result of whether or not data communication has been successful by receiving a confirmation response signal from the destination device. The confirmation response signal is for example, ACK indicating successful data communication, NACK indicating unsuccessful data communication, or the like.

Note here that out of ACK and NACK, ACK is employed in more cases in order to achieve more reliable data communication. The following more specifically describes a case where ACK is employed. In a case where communication of an ACK is unsuccessful, the destination device to which the ACK is transmitted is unable to determine whether the ACK has not been transmitted due to failure in data communication or the destination device itself has failed to receive the ACK although data communication has been successful and the ACK has been transmitted. In either case, however, it is possible to complete the data communication between the devices more reliably through a process such as retransmission. By contrast, the following describes a case where NACK is employed. If data communication is unsuccessful and subsequent communication of an NACK is also unsuccessful, the destination device to which the NACK is transmitted determines that the data communication has been successful and does not perform a process such as retransmission. Consequently, data communication ends up in failure. For the reasons described above, ACK is employed in more cases than NACK.

Furthermore, ACK is used in various wireless communication systems. For example, ACK is used in a public network wireless communication system such as of LTE (Long Term Evolution) or a wireless LAN (Local Area Network) system such as of IEEE 802.11.

In these wireless communication systems, ACK is to be communicated after data communication has been performed. That is, every time data communication is performed, power for the data communication and power for the ACK communication are consumed. Furthermore, in a system such as a wireless LAN system, a type of ACK called a block ACK is employed, which is transmitted after data communication has been performed several times and in which ACKs for the data communication performed several times are aggregated. This saves power for ACK communication but makes it necessary for the source device that transmits data to do more complicated memory management in order to store the data transmitted through the data communication performed several times and perform a process such as retransmission of data for which successful communication is not indicated by the block ACK.

Incidentally, an IoT (Internet of Things) technique has been in active development in recent years. This technique uses Internet-ready terminals mounted on various places, people, or things, and utilizes information collected by the terminals. For example, a technique has been developed which collects various kinds of sensing data from terminals including various sensors and utilizes the thus collected data.

A demand for miniaturization of the terminals themselves has created a demand for miniaturization of batteries of the terminals. There is also a demand for reduction of power consumption in order to reduce an operational cost such as a battery charging cost. It has therefore become more important to reduce power consumption due to wireless communication in the terminals.

Furthermore, in order to collect information related to more places, people, or things, it is necessary for a wireless communication system that implements IoT to include more terminals therein. In order for the wireless communication system to include more terminals, it is important to reduce interference that occurs due to simultaneous data communication among the plurality of terminals.

Furthermore, in order for the wireless communication system to collect information related to places, people, or things where information collection is difficult due to cost constraints, it is necessary to reduce an overall system cost. It is therefore important to reduce the number of base stations having a high installation cost. Examples of methods for achieving the above include a method that enables information collection from a wider range while reducing the number of base stations by increasing a wireless communication distance between a base station and a terminal. One of methods for increasing the wireless communication distance between a base station and a terminal is a method that increases the probability of successful reception by causing the terminal to provide a plurality of data frames including the same data through repeated transmission and causing the base station to select or additively combine these data frames.

However, introducing a confirmation response signal in order to ensure data communication while enabling the wireless communication system to meet the above-described three demands (in other words, a reduction in power consumption by wireless communication devices, a reduction in impact of interference, and a reduction in the number of base stations) poses various challenges in terms of the following points.

A first point is that ACK communication increases power consumption. More specifically, in a case where a plurality of data frames including the same data are provided through repeated transmission as described above, the wireless communication distance between a terminal and a base station depends on the number of times the transmission is repeated (referred to below as "a repeated transmission count"). In other words, the wireless communication distance between a terminal and a base station increases with an increase in the repeated transmission count.

In order to achieve a comparable wireless communication distance with respect to a confirmation response signal to be transmitted from the base station to the terminal, by contrast, it is necessary for the wireless communication system to increase confirmation response signal receiving sensitivity. For example, the base station obtains a gain calculated in accordance with Expression 1 shown below by additively combining data frames, where N represents the repeated transmission count in the transmission of the data frames from the terminal to the base station. For example, the base station obtains a gain of 10 [dB] when N=10.

[Math. 1]

$$\text{Gain [dB]} = 10 \cdot \log_{10} N \quad \text{(Expression 1)}$$

In the case of the confirmation response signal communication, it is necessary for the wireless communication system to increase the confirmation response signal receiving sensitivity by an amount corresponding to the gain calculated in accordance with Expression 1. However, in a case where transmission power for the confirmation response signal is restricted, the wireless communication system increases a period of time of the confirmation response signal communication to make up for the restricted transmission power. For example, in a case where N=10, the wireless communication system increases the period of time of the confirmation response signal communication by a factor of 10. Accordingly, it takes longer for the terminal to receive the confirmation response signal, and as a result the power consumption by the terminal increases.

Furthermore, in a case where data frames are provided through repeated communication and a confirmation response signal is communicated each time a data frame is communicated, power necessary for confirmation response signal reception increases with an increase in the repeated transmission count. In order to avoid this, for example, a method may be employed that communicates a confirmation response signal only once after the repeated transmission. In this case, however, all of terminals perform repeated transmission of data frames until the repeated transmission count reaches an upper limit thereof. Even if the data communication becomes successful before the repeated transmission count reaches the upper limit thereof, data communication is continued thereafter, which is unnecessary. In other words, such unnecessary data communication causes power consumption and interference. The issue is more significant when the number of terminals is greater. In particular, a radio signal transmitted from a terminal located in the vicinity of the base station is a significant interference source for the base station, having a great impact on the base station when the base station receives a radio signal transmitted from another terminal.

In view of the above-described circumstances, the discloser of the present disclosure has devised the first embodiment of the present disclosure. The first embodiment is able to achieve a reduction in power consumption by wireless communication devices, a reduction in impact of interference, and a reduction in the number of base stations at the same time by using a first confirmation response signal and a second confirmation response signal for data frames provided through repeated transmission. The first confirmation response signal is transmitted on a per-data frame basis. The second confirmation response signal is transmitted on a per-repeated transmission basis. The following describes the first embodiment of the present disclosure in detail.

It should be noted that no particular limitations are placed on the target the present disclosure is applied to as long as the target is a wireless communication system. For example, the present disclosure may be applied to a public network wireless communication system including, for example, LTE, may be applied to a wireless LAN system in accordance with IEEE 802.11, or may be applied to other wireless communication systems.

Furthermore, no particular limitations are placed on a device that functions as a transmitter and a receiver of confirmation response signals in these wireless communication systems. For example, both of a parent station (examples thereof include a base station and an access point) and a child station (examples thereof include a terminal and a station) in these wireless communication systems can function as a transmitter and a receiver of confirmation response signals. The following describes a case where the present disclosure is applied to a wireless communication system that implements IoT, a base station functions as a transmitter of confirmation response signals, and a terminal functions as a receiver of the confirmation response signals, as an example.

Furthermore, no particular limitations are placed on the type of the confirmation response signals as long as the confirmation response signals indicate whether or not certain data communication is successful. The following describes a case where ACKs are employed as the confirmation response signals, as an example.

(1-2. Device Configuration)

The background of the first embodiment has been described above. The following describes a device configuration of the wireless communication system with reference to FIG. 1.

As illustrated in FIG. 1, the wireless communication system includes a base station 100 and a terminal 200. No particular limitations are placed on the number of base stations 100 and the number of terminals 200. The following describes a case where the wireless communication system includes one base station 100 and a plurality of terminals 200, as an example.

Each of the terminals 200 is a wireless communication device (may alternatively be referred to as a "second wireless communication device") that is mountable on various places, people, or things and that collects various kinds of information using various sensors included therein. Furthermore, the terminal 200 may collect various kinds of information from another device through wireless communication with the device. The terminal 200 then transmits a data frame including the collected information to the base station 100. Note here that no particular limitations are placed on the types of sensors included in the terminal 200. Examples of sensors that may be included in the terminal 200 include an acceleration sensor, a gyroscope sensor, a geomagnetic sensor, a barometric pressure sensor, a temperature sensor, a vibration sensor, a sound sensor, a heart rate sensor, a pulse wave sensor, a proximity sensor, a illuminance sensor, a pressure sensor, a position sensor, a perspiration sensor, a pH sensor, a humidity sensor, and an infrared sensor.

Furthermore, as described above, the terminal 200 provides data frames through repeated transmission in order to achieve more reliable communication. It should be noted that no particular limitations are placed on transmission intervals of the repeated transmission, the upper limit of the repeated transmission count, the transmission power, and the frame configuration, for example.

The base station 100 is a wireless communication device (may alternatively be referred to as a "first wireless communication device") that provides various services using information provided from any of the terminals 200. For example, the base station 100 provides a user monitoring service using information such as position information and heart rate information collected by a terminal 200 mounted on a user, provides a vehicle rental service using information such as position information collected by a terminal 200 installed in a vehicle such as a bicycle, or provides a building strength monitoring service using information such as vibration information collected by a terminal 200 installed in a building.

Furthermore, as described above, the base station 100 transmits an ACK as a confirmation response signal to a terminal 200 upon receiving data frames from the terminal 200 through the repeated transmission and succeeding in a reception process. The ACK according to the first embodiment will be described later.

Note here that the base station 100 and the terminals 200 implement IoT more adequately using LPWA (Low Power Wide Area). LPWA refers to a wireless communication technique that enables communication in a wider range (in kilometers) with lower power consumption. LPWA is effective and able to reduce power consumption particularly in a case where a large number of terminals 200 perform communication and a data frame size is relatively small, like a wireless communication system that implements IoT. It should be noted that application of LPWA is merely an example, and LPWA does not have to be applied.

(1-3. Overview of Functions)

The device configuration of the wireless communication system has been described above. The following describes an overview of functions of the wireless communication system.

Upon succeeding in the reception process of the data frames provided through the repeated transmission by the terminal 200, the base station 100 transmits ACKs to the terminal 200. That is, the base station 100 uses an ACK being the first confirmation response signal (referred to below as "ACK 1"), which is transmitted on a per-data frame basis for each of the data frames provided through the repeated transmission, and an ACK being the second confirmation response signal (referred to below as "ACK 2"), which is transmitted on a per-repeated transmission basis.

Then, the base station 100 sets a frame length of the ACK 1 to a value smaller than a frame length of the ACK 2. More specifically, the base station 100 sets the frame length of the ACK 1 to a value smaller than the frame length of the ACK 2, so that a reception time taken for the terminal 200 to receive the ACK 1 is shorter than a reception time taken for the terminal 200 to receive the ACK 2, reducing power necessary for the reception of the ACK 1. Furthermore, in a case where the terminal 200 is located in the vicinity of the base station 100, it is highly likely that even the reception process of an ACK 1 having a shorter frame length is successfully completed. Accordingly, the base station 100 is able to reduce the count of the repeated data frame transmission by the terminal 200 by transmitting the ACK 1 on a per-data frame basis for each of the data frames provided through the repeated transmission. It is therefore possible to suppress occurrence of interference.

Furthermore, even if the terminal 200 fails in the reception process of the ACK 1, the base station 100 is able to notify the terminal 200 of successful data frame communication by transmitting the ACK 2 having a longer frame length than the ACK 1 on a per-repeated transmission basis (in other words, once the repeated transmission count based on the data frames transmitted has reached the upper limit thereof). For example, in a case where the terminal 200 is located far from the base station 100, it is highly likely that the reception process of the ACK 1 having a shorter frame length ends up in failure, and therefore the ACK 2 functions more effectively.

Now, an example of an operation of the base station 100 and the terminals 200 will be described with reference to FIGS. 2 and 3. It should be noted that the example will be described using a terminal 200A located in the vicinity of the base station 100 and a terminal 200B located far from the base station 100 as illustrated in FIG. 1. Furthermore, the example will be described on the assumption that the upper limit of the repeated transmission count is four.

FIG. 2 illustrates an example of wireless communication between the base station 100 and the terminal 200A located in the vicinity of the base station 100. As illustrated in FIG. 2, the terminal 200A transmits a data frame including collected information (written as "UL (Up Link) Data frame" in FIG. 2) in a repeated manner, and the base station 100 succeeds in the reception process and transmits an ACK 1 upon receiving the data frame transmitted for the second time. The terminal 200A recognizes that the reception process of the data frame has been successful through reception of the ACK 1, and omits the transmission process for the third and fourth times. This enables the terminal 200A to save power necessary for the transmission process for the third and fourth times and suppress occurrence of interference.

FIG. 3 illustrates an example of wireless communication between the base station 100 and the terminal 200B located far from the base station 100. As illustrated in FIG. 3, the base station 100 succeeds in the reception process and transmits an ACK 1 upon receiving the data frame transmitted for the fourth time, which amounts to the upper limit of the repeated transmission count. Furthermore, since the repeated transmission count has reached the upper limit thereof, the base station 100 also transmits an ACK 2 after the transmission of the ACK 1.

The terminal 200B fails in the reception process of the ACK 1 due to lack of sufficient reception sensitivity. Thereafter, the terminal 200B succeeds in the reception process of the ACK 2 having a longer frame length to recognize that the reception process of the data frame has been successful. As described above, the base station 100 allows the terminal 200B located far from the base station 100 to succeed in the reception process of the ACK 2 by setting the frame length of the ACK 2 to a value larger than the frame length of the ACK 1.

(1-4. Frame Configuration)

The overview of the functions of the wireless communication system has been described above. The following describes a frame configuration of a frame to be communicated in the wireless communication system.

(Frame Configuration of Data Frame)

First, an example of the frame configuration of a data frame to be generated by any of the terminals 200 will be described with reference to FIG. 4.

As illustrated in FIG. 4, the data frame to be generated by the terminal 200 includes "Preamble", "UL (Up Link) PHY Header", "UL (Up Link) MAC Header", "Information", and "CRC".

(Preamble)

The Preamble is a signal having a predetermined fixed pattern and is used for detection of the data frame. The base station 100 receiving the data frame determines a correlation value between the signal being received and a signal having the same fixed pattern as the Preamble. On the basis of the fact that the determined correlation value is larger than a predetermined value, the base station 100 detects the data frame, and then grasps a reception timing. It should be noted that a fixed pattern unique to the type of the frame may be used or a fixed pattern unique to each terminal 200 may be used as the fixed pattern for the Preamble. A case where a fixed pattern unique to each terminal 200 is used will be described in detail in "5. Fifth Embodiment".

(UL PHY Header)

The UL PHY Header is a field including various parameters of a physical layer. In a case where a plurality of modulation schemes is provided for a portion after the UL PHY Header, for example, inclusion of information related to these modulation schemes in the UL PHY Header enables the base station 100 receiving the data frame to correctly recognize demodulation schemes. It should be noted that no particular limitations are placed on the information included in the UL PHY Header. Furthermore, in a case where only one modulation scheme is provided, for example, the UL PHY Header may be omitted. The UL PHY Header may be omitted by a method such as deleting the UL PHY Header field itself or replacing the UL PHY Header field with fixed pattern information.

(UL MAC Header)

The UL MAC Header is a field including various parameters related to control of a MAC layer. No particular limitations are placed on the parameters included in the UL MAC Header. Examples of parameters that may be included in the UL MAC Header include address information of the terminal 200 being a transmission source of the data frame or the base station 100 being a destination of the data frame, identification information of the subsequent Information, information related to the content of the Information (for example, information indicating that the content of the Information is data such as position data or temperature data), and data length information of the Information. Additionally, the UL MAC Header may include an ACK-related mode as a parameter. It should be noted that the ACK-related mode will be described later in detail.

(Information)

The Information is a field storing therein information collected by the sensors and the like. Information collected by the sensors in the terminal 200 may be stored as is or may be stored after being subjected to some processing. Note here that the processing may for example include, but is not limited to, a process of quantizing sequential data, a process of converting measured data to abstract information such as "high" or "low", and a filtering process of denoising.

(CRC)

The CRC is redundancy information to be used for error detection by the base station 100 that receives the data frame. The redundancy information is generated by processing inputted data on the basis of a predetermined CRC generation rule. Note here that the inputted data is for example the UL MAC Header and the Information.

(PHY Payload)

An error correction technique may be applied to each of the above-described fields. For example, the error correction technique may be applied to the UL MAC Header, the Information, and the CRC. Note here that the error correction technique to be applied for example includes, but is not limited to, a common technique such as convolutional codes or LDPC (Low Density Parity Check) codes. Application of such error correcting codes causes an increase in the data length depending on an encoding rate. Information to which the error correcting codes have been applied is stored in the PHY Payload.

It should be noted that the entire data frame may be spread or scrambled using a pseudo-random sequence (for example, a PN (Pseudo Noise) sequence, or the like). The spreading herein for example includes, but is not limited to, direct spectrum spreading to convert 1 [symbol] of the data frame to N [symbol] by multiplying 1 [symbol] by a pseudo-random sequence having a sampling rate that is N times 1 [symbol]. The base station 100 receiving the data frame is able to acquire the original signal by performing despreading using the same pseudo-random sequence. It should be noted that the process is referred to as scrambling when N=1.

It should be noted that the frame configuration of the data frame is not limited to the configuration illustrated in FIG. 4. For example, the frame configuration of the data frame may be a configuration illustrated in FIG. 5. In the frame configuration illustrated in FIG. 5, only one modulation scheme (for example, but not limited to, BPSK (Binary Phase-Shift Keying) modulation) is defined thereby to omit the UL PHY Header in order to improve transmission efficiency. Furthermore, ID, which is identification information of the terminal 200 being a transmission source, and ACK mode, which is ACK-related mode information replace the UL MAC Header. The use of the frame configuration illustrated in FIG. 5 enables the terminal 200 and the base station 100 to reduce power necessary for communication of the data frame. It should be noted that the ACK-related mode will be described later in detail.

(Frame Configuration of ACK 1)

The following describes an example of a frame configuration of an ACK 1 to be generated by the base station 100 with reference to FIG. 6.

As illustrated in FIG. 6, the ACK 1 to be generated by the base station 100 includes "Preamble", "DL (Down Link) MAC Header", and "CRC".

(Preamble)

The Preamble is a signal having a predetermined fixed pattern and is used for detection of the ACK 1. The terminal 200 receiving the ACK 1 determines a correlation value between the signal being received and a signal having the same fixed pattern as the Preamble. On the basis of the fact that the determined correlation value is larger than a predetermined value, the terminal 200 detects the ACK 1, and then grasps a reception timing. It should be noted that a fixed pattern unique to the type of the frame may be used or a fixed pattern unique to each terminal 200 may be used as the fixed pattern for the Preamble. The case where a fixed pattern unique to each terminal 200 is used will be described in detail in "5. Fifth Embodiment".

Furthermore, the correlation value increases with an increase in the data length of the Preamble. Accordingly, noise immunity increases and the maximum possible communication distance increases. However, power necessary for the reception process by the terminal 200 increases with an increase in the data length of the Preamble. Note here that the ACK 1 mainly aims at a reduction in the repeated transmission count in a terminal 200 located in the vicinity of the base station 100 while reducing power necessary for the reception process by the terminal 200, and therefore the data length of the Preamble of the ACK 1 is set to a value smaller than that of the ACK 2 described later.

(DL MAC Header)

The DL MAC Header is a field including various parameters related to control of a MAC layer. No particular limitations are placed on the parameters included in the DL MAC Header. Examples of parameters that may be included in the DL MAC Header include address information of the base station 100 being a transmission source of the ACK 1 or address information of the terminal 200 being a destination of the ACK 1.

(CRC)

The CRC is redundancy information to be used for error detection by the terminal 200 receiving the ACK 1. The redundancy information is generated by processing inputted data on the basis of a predetermined CRC generation rule. Note here that the inputted data is for example the DL MAC Header.

(PHY Payload)

An error correction technique may be applied to each of the above-described fields. For example, the error correction technique may be applied to the DL MAC Header and the CRC. Note here that the error correction technique to be applied for example includes, but is not limited to, a common technique such as convolutional codes or LDPC codes. Application of such error correcting codes causes an increase in the data length depending on the encoding rate. Information to which the error correcting codes have been applied is stored in the PHY Payload.

It should be noted that the encoding rate is generally expressed as R=1/3 or R=1/4, for example. An encoding rate of R=1/3 means that conversion is performed to increase an input by a factor of 1/R=3. Information corresponding to a resulting increase is redundancy information. The noise immunity increases with an increase in the redundancy information. Accordingly, the maximum possible communication distance increases. However, power necessary for the reception process by the terminal 200 increases with an increase in the redundancy information. Note here that the ACK 1 mainly aims at a reduction in the repeated transmission count in a terminal 200 located in the vicinity of the base station 100 while reducing power necessary for the reception process by the terminal 200, and therefore the encoding rate that is used for the ACK 1 gives less redundancy information than that for the ACK 2.

Furthermore, the noise immunity may be increased by storing each kind of information in a repeated manner in the ACK 1. For example, the DL MAC Header and the CRC may be repeated several times and stored in the PHY Payload. The noise immunity increases with an increase in the repeat count of the stored DL MAC Header and the stored CRC. Accordingly, the maximum possible communication distance increases. However, power necessary for the reception process by the terminal 200 increases with an increase in the repeat count of the stored DL MAC Header and the stored CRC. Note here that the ACK 1 mainly aims at a reduction in the repeated transmission count in a terminal 200 located in the vicinity of the base station 100 while reducing power necessary for the reception process by the terminal 200, and therefore the repeat count of the stored DL MAC Header and the stored CRC that is set for the ACK 1 is smaller than that for the ACK 2 described later.

(Frame Configuration of ACK 2)

The following describes an example of a frame configuration of an ACK 2 to be generated by the base station 100 with reference to FIG. 7.

As illustrated in FIG. 7, the ACK 2 to be generated by the base station 100 includes "Preamble", "DL MAC Header", and "CRC".

(Preamble)

The Preamble is a signal having a predetermined fixed pattern and is used for detection of the ACK 2. The terminal 200 receiving the ACK 2 determines a correlation value between the signal being received and a signal having the same fixed pattern as the Preamble. On the basis of the fact that the determined correlation value is larger than a predetermined value, the terminal 200 detects the ACK 2, and then grasps a reception timing. It should be noted that a fixed pattern unique to the type of the frame may be used or a fixed pattern unique to each terminal 200 may be used as the fixed pattern for the Preamble. The case where a fixed pattern unique to each terminal 200 is used will be described in detail in "5. Fifth Embodiment".

Furthermore, as described above, the data length of the Preamble of the ACK 2 is set to a value larger than the data length of the Preamble of the ACK 1. For example, the data length of the Preamble of the ACK 2 can be set to a value substantially equal to the data length of the Preamble of the data frame generated by the terminal 200.

(DL MAC Header)

The DL MAC Header is a field including various parameters related to control of a MAC layer. No particular limitations are placed on the parameters included in the DL MAC Header. Examples of parameters that may be included in the DL MAC Header include address information of the base station 100 being a transmission source of the ACK 2 or address information of the terminal 200 being a destination of the ACK 2.

(CRC)

The CRC is redundancy information to be used for error detection by the terminal 200 receiving the ACK 2. The redundancy information is generated by processing inputted data on the basis of a predetermined CRC generation rule. Note here that the inputted data is for example the DL MAC Header.

(PHY Payload)

As in the case of the ACK 1, an error correction technique may be applied to each of the above-described fields. For example, the error correction technique may be applied to the DL MAC Header and the CRC. Note here that the error correction technique to be applied for example includes, but is not limited to, a common technique such as convolutional codes or LDPC codes. Information to which the error correcting codes have been applied is stored in the PHY Payload. As described above, the encoding rate that is used for the ACK 2 gives more redundancy information than that for the ACK 1. Furthermore, in a case where the noise immunity is increased by storing each kind of information in a repeated manner in the ACK 2, the repeat count of the stored DL MAC Header and the stored CRC is set to a value larger than that in the ACK 1.

(1-5. Functional Configuration)

The frame configuration of the frame to be communicated in the wireless communication system has been described above. The following describes a functional configuration of each of the terminals 200 and the base station 100.

(Functional Configuration of Terminal 200)

First, the functional configuration of the terminal 200 will be described with reference to FIG. 8. As illustrated in FIG. 8, the terminal 200 includes a sensor information acquisition section 210, a mode selector 220, a data frame generator 230, a transmission controller 240, a transmission section 250, a reception section 260, and a reception controller 270.

(Sensor Information Acquisition Section 210)

The sensor information acquisition section 210 has a functional configuration that acquires various kinds of information from various sensors included in the own device. No particular limitations are placed on a trigger or a timing of the acquisition of the various kinds of information by the sensor information acquisition section 210. For example, the sensor information acquisition section 210 may acquire the various kinds of information on the basis of a trigger provided from specific application. Furthermore, the sensor information acquisition section 210 may acquire the various kinds of information at predetermined periodicity or at a timing immediately before transmission of a data frame. Furthermore, as described above, the sensor information acquisition section 210 may acquire the various kinds of information from another device through wireless communication with the device. Furthermore, the sensor information acquisition section 210 may perform processing (examples thereof include a process of quantizing sequential data, a process of converting measured data to abstract information such as "high" or "low", and a filtering process of denoising) on the acquired information in addition to mere information acquisition. The sensor information acquisition section 210 provides the acquired information to the data frame generator 230.

(Mode Selector 220)

The mode selector 220 has a functional configuration that selects an ACK-related mode. More specifically, the terminal 200 includes, in a data frame, information as to whether or not any ACK is necessary and the type of the ACK as the ACK-related mode thereby to notify the base station 100 of the information, specifying whether or not any ACK is necessary and the type of the ACK. For example, the mode selector 220 may select "(A) receive no ACK (in other words, receive neither ACK 1 nor ACK 2)", "(B) receive only ACK 1", "(C) receive only ACK 2", or "(D) receive ACK 1 and ACK 2" as illustrated in FIG. 9. It should be noted that a mode selection method will be described in detail in "1-6. Mode Selection Method". Furthermore, FIG. 9 is merely an example, and no particular limitations are placed on the contents of the ACK-related modes. The mode selector 220 provides information of the selected ACK-related mode to the data frame generator 230 and the reception controller 270.

(Data Frame Generator 230)

The data frame generator 230 has a functional configuration that generates a data frame on the basis of the information provided from the sensor information acquisition section 210 (for example, information collected by various sensors) and the information of the ACK-related mode provided from the mode selector 220. For example, as illustrated in FIG. 5, the data frame generator 230 generates the data frame by storing the information provided from the sensor information acquisition section 210 in the Information and storing the information of the ACK-related mode provided from the mode selector 220 (for example, any of bits obtained through quantization of the respective modes in FIG. 9) in the ACK mode. The data frame generator 230 provides the generated data frame to the transmission controller 240.

(Transmission Controller 240)

The transmission controller 240 has a functional configuration that controls a transmission process of the data frame generated by the data frame generator 230 and is also referred to as a second transmission controller. More specifically, the transmission controller 240 generates a baseband transmission signal (for example, 50 [ksps] or the like) by performing processing such as encoding, interleaving, and modulation on the data frame in accordance with, for example, predetermined parameters. The transmission controller 240 then provides the generated baseband transmission signal to the transmission section 250. Furthermore, the transmission controller 240 provides information related to, for example, a repeated transmission count and a transmission timing to the reception controller 270.

Furthermore, the transmission controller 240 performs control to repeat transmission of the data frame until the repeated transmission count reaches the upper limit thereof or until an ACK 1 is received. It should be noted that no particular limitations are placed on the transmission timing of the data frame. For example, the transmission controller 240 may perform control to cause the data frame to be transmitted on the basis of a trigger provided from specific application or perform control to cause the data frame to be transmitted at predetermined periodicity.

(Transmission Section 250)

The transmission section 250 has a functional configuration that converts the baseband transmission signal provided from the transmission controller 240 to a radio signal having a carrier frequency (for example, 920 [MHz], or the like) by performing up conversion on the baseband transmission signal, and transmits the radio signal from a transmitting antenna.

(Reception Section 260)

The reception section 260 has a functional configuration that converts the radio signal having a carrier frequency provided from a receiving antenna to a baseband reception signal by performing analog processing and down conversion on the radio signal. The reception section 260 provides the baseband reception signal to the reception controller 270.

(Reception Controller 270)

The reception controller 270 has a functional configuration that controls the reception process of, for example, ACKs on the basis of the information of the ACK-related mode provided from the mode selector 220 and the information related to, for example, the repeated transmission count and the transmission timing provided from the transmission controller 240. The reception controller 270 is also referred to as a second reception controller. More specifically, in a case where the mode to receive an ACK 1 is selected by the mode selector 220, the reception controller 270 performs the reception process of an ACK 1 at a specific time decided according to the transmission timing of each of data frames being transmitted. Furthermore, in a case where the mode to receive an ACK 2 is selected by the mode selector 220, the reception controller 270 performs the reception process of an ACK 2 at a specific time decided according to the transmission timing of the data frame lastly transmitted in the repeated transmission. Moreover, in a case where the mode to receive neither an ACK 1 nor an ACK 2 is selected by the mode selector 220, the reception controller 270 omits the reception process of any ACK 1 or any ACK 2.

The reception controller 270 performs demodulation on the baseband reception signal provided from the reception section 260 in accordance with, for example, predetermined parameters, and subsequently extracts the PHY Payload to perform error correction decoding. The reception controller 270 confirms presence or absence of an error in decoded data on the basis of the CRC. Upon determining the absence of an error in the decoded data, the reception controller 270 determines whether or not the ACK being received is addressed to the own device on the basis of destination information included in the DL MAC Header. In a case where the ACK is addressed to the own device, the reception controller 270 shares the reception of the ACK addressed to the own device with the transmission controller 240.

(Functional Configuration of Base Station 100)

The following describes the functional configuration the base station 100 with reference to FIG. 10. As illustrated in FIG. 10, the base station 100 includes a reception section 110, a reception controller 120, a sensor information acquisition section 130, an ACK generator 140, a transmission controller 150, and a transmission section 160.

(Reception Section 110)

The reception section 110 has a functional configuration that converts the radio signal having a carrier frequency provided from the receiving antenna to a baseband reception signal (for example, 50 [ksps], or the like) by performing analog processing and down conversion on the radio signal. The reception section 110 provides the baseband reception signal to the reception controller 120.

(Reception Controller 120)

The reception controller 120 has a functional configuration that controls the reception process of the data frame and is also referred to as a first reception controller. More specifically, the reception controller 120 performs demodulation on the baseband reception signal provided from the reception section 110 in accordance with, for example, predetermined parameters, and subsequently extracts the PHY Payload to perform error correction decoding. The reception controller 120 confirms presence or absence of an error in decoded data on the basis of the CRC. Upon determining the absence of an error in the decoded data, the reception controller 120 extracts the Information and the UL MAC Header. The reception controller 120 then provides the Information to the sensor information acquisition section 130 and provides the UL MAC Header together with information related to a data frame reception count to the ACK generator 140.

Upon determining the presence of an error in the decoded data, the reception controller 120 discards or accumulates the received data frame. The reception controller 120 accumulating the received data frame may be able to restore an error-free data frame by additively combining this accumulated data frame and a previously or subsequently received data frame. This configuration enables the reception controller 120 to increase the probability of the successful reception process with a lower reception count.

(Sensor Information Acquisition Section 130)

The sensor information acquisition section 130 has a functional configuration that acquires sensor information from the Information provided from the reception controller 120. More specifically, depending on a process performed by the terminal 200 that has transmitted the data frame, the sensor information acquisition section 130 may acquire information included in the Information as is as the sensor information or may acquire the sensor information by restoring information processed by the terminal 200. For example, the sensor information acquisition section 130 may acquire the sensor information by performing processing such as a process of converting quantized data back to sequential data or a process of converting abstracted data back to unabstracted data. It should be noted that no particular limitations are placed on the content of the information to be acquired by the sensor information acquisition section 130 as long as the information is included in the Information.

(ACK Generator 140)

The ACK generator 140 has a functional configuration that controls generation of an ACK 1 or an ACK 2 on the basis of the information of the ACK-related mode included in the UL MAC Header provided from the reception controller 120. More specifically, in a case where "(A) receive no ACK" in FIG. 9 is selected, the ACK generator 140 generates neither an ACK 1 nor an ACK 2 even if the received data frame includes no error.

Furthermore, in a case where "(B) receive only ACK 1" or "(D) receive ACK 1 and ACK 2" is selected, the ACK generator 140 generates an ACK 1 as long as the received data frame includes no error. It should be noted that the ACK generator 140 records, in the DL MAC Header of the ACK 1, the identification information of the terminal 200 being a transmission source of the data frame. The identification information of the terminal 200 is included in the UL MAC Header of the data frame.

Moreover, in a case where "(C) receive only ACK 2" or "(D) receive ACK 1 and ACK 2" is selected, the ACK generator 140 generates an ACK 2 on the condition that the information related to the data frame reception count provided from the reception controller 120 is equal to the upper limit of the repeated transmission count and the received data frame includes no error. It should be noted that the ACK generator 140 records, in the DL MAC Header of the ACK 2, the identification information of the terminal 200 being a transmission source of the data frame. The identification information of the terminal 200 is included in the UL MAC Header of the data frame.

(Transmission Controller 150)

The transmission controller 150 has a functional configuration that controls a transmission process of an ACK 1 or an ACK 2 generated by the ACK generator 140 and is also referred to as a first transmission controller. More specifically, the transmission controller 150 generates a baseband transmission signal (for example, 50 [ksps], or the like) by performing processing such as encoding, interleaving, and modulation on the ACK 1 or the ACK 2 in accordance with, for example, predetermined parameters. The transmission controller 150 then provides the generated baseband transmission signal to the transmission section 160. It should be noted that the signal of which the transmission controller 150 controls the transmission process is not limited to the ACK 1 or the ACK 2. For example, the transmission controller 150 may control the transmission process of any data frame.

(Transmission Section 160)

The transmission section 160 has a functional configuration that converts the baseband transmission signal provided from the transmission controller 150 to a radio signal having a carrier frequency (for example, 920 [MHz], or the like) by performing up conversion on the baseband transmission signal, and transmits the radio signal from a transmitting antenna.

(1-6. Mode Selection Method)

The functional configuration of each of the terminals 200 and the base station 100 has been described above. The following describes examples of methods for selecting an ACK-related mode by the mode selector 220 of the terminal 200.

The mode selector 220 is able to select an ACK-related mode according to various methods. For example, the mode selector 220 may select a mode on the basis of the content or the type of data to be transmitted. For example, in a case where data is periodically transmitted, and it is possible for the base station 100 to, even if communication of the data is unsuccessful, complement the data using previously communicated data or subsequently communicated data (for example, a case where the transmitted data is a portion of continuous data, or the like), the mode selector 220 may select "(A) receive no ACK". This enables the terminal 200 to omit an ACK receiving operation, thereby reducing power consumption and suppressing occurrence of interference.

Furthermore, the mode selector 220 may select a mode on the basis of a remaining power amount in the terminal 200. For example, the mode selector 220 may select "(A) receive no ACK" in a case where the remaining power amount is smaller than a predetermined value.

Furthermore, the mode selector 220 may select a mode on the basis of the past communication situation with respect to data frames. For example, in a case where a success rate of data frame communication in the past is extremely high, the mode selector 220 may estimate that the probability of successful data frame communication in the future is also extremely high and select "(A) receive no ACK".

Furthermore, the mode selector 220 may select a mode on the basis of the past reception situation with respect to an ACK 1. For example, in a case where the terminal 200 has successfully received an ACK 1 in the past (for example, during the last repeated transmission), the mode selector 220 may determine that the terminal 200 is at a location where an ACK 1 is receivable (for example, a location in the vicinity of the base station 100, or the like) and select "(B) receive only ACK 1". This enables the terminal 200 to omit redundant communication of an ACK 2, thereby reducing power consumption and suppressing occurrence of interference.

Furthermore, in a case where the terminal 200 has failed to receive an ACK 1 in the past (for example, during the last repeated transmission), for example, the mode selector 220 may determine that the terminal 200 is at a location where an ACK 1 is not receivable (for example, a location far from the base station 100, or the like) and select "(C) receive only ACK 2". This enables the terminal 200 to omit communication of a redundant ACK 1, thereby reducing power consumption and suppressing occurrence of interference.

Alternatively, in a case where there is no or few results of ACK or data frame communication in the past or in a case where a period of time longer than a predetermined period of time has elapsed since the last repeated transmission, the mode selector 220 may determine that it is uncertain whether or not the reception process of an ACK 1 will be successful, and select "(D) receive ACK 1 and ACK 2". This enables the terminal 200 to receive an ACK more reliably.

It should be noted that in a case where the terminal 200 includes a sensor that can acquire position information, such as a GNSS (Global Navigation Satellite System) sensor, the mode selector 220 may consider whether or not a change in a position of the terminal 200 from a position thereof at a time point in the past (for example, time point in the last repeated transmission) is greater than a predetermined value, or whether or not a distance between the terminal 200 and the base station 100 is smaller than or equal to a predetermined value (as long as the position of the base station 100 is known). For example, in a case where the change in position of the terminal 200 from the position thereof at a time point in the past (for example, time point in the last repeated transmission) is greater than the predetermined value, the mode selector 220 may determine that it is uncertain whether or not the reception process of the ACK 1 will be successful, and select "(D) receive ACK 1 and ACK 2". It should be noted that the above-described mode selection methods are merely examples and are not particularly limiting.

(1-7. Operation)

Examples of methods for selecting an ACK-related mode by the mode selector 220 of the terminal 200 have been described above. The following describes an operation of each of the terminals 200 and the base station 100.

(Operation of Terminal 200)

First, an example of the operation of the terminal 200 will be described with reference to FIG. 11. The terminal 200 starts an operation illustrated in FIG. 11 in response to a trigger provided from a specific application or at predetermined periodicity, for example. It should be noted that the start timing of the operation is not limited thereto.

At step S1000, the sensor information acquisition section 210 acquires sensor information from various sensors. For example, the sensor information acquisition section 210 acquires the sensor information acquired by sensors such as a GNSS sensor, a temperature sensor, an acceleration sensor, and a gyroscope sensor. At step S1004, the mode selector 220 selects an ACK-related mode. At step S1008, the data frame generator 230 generates a data frame on the basis of the sensor information provided from the sensor information acquisition section 210 and the information of the ACK-related mode provided from the mode selector 220.

At step S1012, the transmission controller 240 transmits the data frame generated by the data frame generator 230 to the base station 100. At step S1016, in a case where the reception process of an ACK 1 is necessary according to the ACK-related mode selected by the mode selector 220, the reception controller 270 performs the reception process of the ACK 1. In a case where the reception process of the ACK 1 by the reception controller 270 is successful (Yes at step S1016), the reception controller 270 determines whether or not the ACK 1 is addressed to the own device on the basis of the destination information included in the DL MAC Header of the ACK 1 at step S1020.

In a case where the ACK 1 is addressed to the own device (Yes at step S1020), the reception controller 270 recognizes that the base station 100 has succeeded in the reception process of the data frame, and the operation ends. In a case where the reception process of the ACK 1 is not necessary according to the mode selected by the mode selector 220 or the reception process of the ACK 1 is unsuccessful at step S1016 (No at step S1016), or in a case where the ACK 1 is not addressed to the own device (No in step S1020), the transmission controller 240 confirms whether or not the repeated transmission count has reached the upper limit thereof at step S1024.

In a case where the repeated transmission count has not reached the upper limit thereof (No at step S1024), the operation returns to step S1012, and the data frame transmission process and the control of the reception of the ACK 1 are continued until the repeated transmission count reaches the upper limit thereof. In a case where the repeated transmission count has reached the upper limit thereof (Yes at step S1024), the reception controller 270 performs the reception process of an ACK 2 at step S1028 on the condition that the reception process of the ACK 2 is necessary according to the mode selected by the mode selector 220. In a case where the reception controller 270 succeeds in the reception process of the ACK 2 (Yes at step S1028), the reception controller 270 determines whether or not the ACK 2 is addressed to the own device on the basis of the destination information included in the DL MAC Header of the ACK 2 at step S1032.

In a case where the ACK 2 is addressed to the own device (Yes at step S1032), the reception controller 270 recognizes that the base station 100 has succeeded in the reception process of the data frame, and the operation ends. In a case where the reception process of the ACK 2 is not necessary according to the mode selected by the mode selector 220 or in a case where the reception of the ACK 2 is unsuccessful at step S1028 (No at step S1028), or in a case where the ACK 2 is not addressed to the own device (No at step S1032), the operation ends. In such a case, the reception controller 270 fails to recognize whether or not the base station 100 has succeeded in the reception process of the data frame.

It should be noted that the operation of the terminal 200 is not limited to the above-described example. For example, the transmission controller 240 may retransmit the data frame in a case where the mode selector 220 selects a mode to receive an ACK 1, an ACK 2, or both and in a case where neither the reception process of the ACK 1 nor the reception process of the ACK 2 is successful.

(Operation of Base Station 100)

Next, an example of the operation of the base station 100 will be described with reference to FIG. 12.

At step S1100, the reception controller 120 clears out a storage region in which data frames received in the past are to be stored for additive combination. At step S1104, the reception controller 120 checks an amount of time that has elapsed since the start of the reception process for a cancellation (in other words, timeout) of the reception process to be made in a case where the reception process is not complete even after a predetermined period of time has elapsed. This example is on the assumption that an end of such a timeout period is between a time of an end of the transmission process of data frames performed until the repeated transmission count reaches the upper limit thereof and a time of a start of the transmission of the ACK 2. However, the end of the timeout period is not limited to such an example.

In a case where the timeout does not occur (No at step S1104), the reception controller 120 calculates a correlation value between the signal being received and the fixed pattern used for the Preamble of the data frame, and tries to detect the data frame at step S1108. In a case where the reception controller 120 determines that the data frame has been detected on the basis of the fact that the calculated correlation value is larger than a predetermined value (Yes at step S1108), the reception controller 120 stores the data frame in the storage region at step S1112. In a case where there is a data frame already stored in the storage region, the reception controller 120 performs either an overwriting process or an additive combination process. In a case where the reception controller 120 fails to detect the data frame (No in step S1108), the reception controller 120 keeps trying to detect the data frame until the timeout occurs.

At step S1116, the reception controller 120 performs signal processing on the PHY Payload of the data frame. In a case where an error correction technique is applied, the reception controller 120 performs error correction according to the technique. At step S1120, the reception controller 120 determines whether or not decoding of the data frame is successful by performing processing related to the CRC included in the data frame. In a case where the reception controller 120 determines that the decoding of the data frame is successful (Yes at step S1120), the operation shifts to control of ACK transmission.

In a case where the reception controller 120 determines that the decoding of the data frame is unsuccessful (No at step S1120), the reception controller 120 compares the data frame reception count with the upper limit of the repeated transmission count at step S1144. In a case where the data frame reception count has not reached the upper limit of the repeated transmission count (No at step S1144), the operation returns to step S1104, and the reception controller 120 keeps trying to detect the data frame until the timeout occurs. In a case where the data frame reception count has reached the upper limit of the repeated transmission count (Yes at step S1144), the operation ends.

At step S1124, the ACK generator 140 checks the ACK mode included in the UL MAC Header of the data frame to confirm whether or not an ACK 1 is requested by the terminal 200. In a case where an ACK 1 is requested (Yes at step S1124), the ACK generator 140 generates an ACK 1 and the transmission controller 150 transmits the ACK 1 to the terminal 200 at step S1128. In a case where an ACK 1 is not requested (No at step S1124), the generation and the transmission of an ACK 1 at step S1128 are not performed.

At step S1132, the reception controller 120 compares the data frame reception count with the upper limit of the repeated transmission count. In a case where the data frame reception count has not reached the upper limit of the repeated transmission count (No at step S1132), the operation returns to step S1104, and the reception controller 120 keeps trying to detect the data frame until the timeout occurs. In a case where the data frame reception count has reached the upper limit of the repeated transmission count (Yes at step S1132), the ACK generator 140 checks the ACK mode included in the UL MAC Header of the data frame and confirms whether or not an ACK 2 is requested by the terminal 200 at step S1136.

In a case where an ACK 2 is requested (Yes at step S1136), the ACK generator 140 generates an ACK 2 and the transmission controller 150 transmits the ACK 2 to the terminal 200 at step S1140. In a case where an ACK 2 is not requested (No at step S1136), the generation and the transmission of an ACK 2 at step S1140 are not performed, and the operation ends.

In a case where the timeout occurs at step S1104 (Yes at step S1104), the reception controller 120 determines whether or not decoding of a data frame previously received through the repeated transmission is successful at step S1148. In a case where the reception controller 120 determines that the decoding of the data frame previously received through the repeated transmission is successful (Yes at step S1148), the ACK generator 140 checks the ACK mode included in the UL MAC Header of the data frame and confirms whether or not an ACK 2 is requested by the terminal 200 at step S1152.

In a case where an ACK 2 is requested (Yes at step S1152), the ACK generator 140 and the transmission controller 150 enter standby until the transmission timing of an ACK 2. Once the transmission timing of an ACK 2 has come (Yes at step S1156), the ACK generator 140 generates an ACK 2 and the transmission controller 150 transmits the ACK 2 to the terminal 200 at step S1160.

In a case where the reception controller 120 determines that the decoding of the data frame previously received through the repeated transmission is unsuccessful at step S1148 (No at step S1148), and in a case where an ACK 2 is not requested at step S1152 (No at step S1152), the generation and the transmission of an ACK 2 are not performed, and the operation ends.

(Sequence Diagrams Illustrating Operations of Terminal 200 and Base Station 100)

The following describes a sequence diagram illustrating operations of the terminal 200 and the base station 100 with reference to FIGS. 13 to 16. FIGS. 13 to 16 are sequence diagrams illustrating operations corresponding to the respective ACK-related modes illustrated in FIG. 9. It should be noted that the upper limit of the repeated transmission count is two in FIGS. 13 to 16, for descriptive purposes. In FIGS. 13 to 16, the terminal 200 fails to detect an ACK 1, and thus the reception process of the ACK 1 is unsuccessful (that is, the ACK 1 is transmitted until the repeated transmission count reaches the upper limit thereof).

FIG. 13 is a sequence diagram illustrating the operation corresponding to a case where "(D) receive ACK 1 and ACK 2" in FIG. 9 is selected.

At step S1200, the sensor information acquisition section 210 of the terminal 200 acquires sensor information from various sensors. At step S1204, the mode selector 220 selects an ACK-related mode. At step S1208, the data frame generator 230 generates a data frame on the basis of the sensor information provided from the sensor information acquisition section 210 and the information of the ACK-related mode provided from the mode selector 220. At step S1212, the transmission controller 240 performs the transmission process of the data frame generated by the data frame generator 230.

At step S1216, the reception controller 120 of the base station 100 succeeds in the reception process of the data frame transmitted from the terminal 200. At step S1220, the ACK generator 140 generates an ACK 1 and the transmission controller 150 performs the transmission process of the ACK 1.

At step S1224, the reception controller 270 of the terminal 200 fails in the reception process of the ACK 1. Since the transmission controller 240 is unable to determine whether or not the reception process of the data frame by the base station 100 is successful, the transmission process of the data frame is performed again at step S1228. Processes to be performed at steps S1232 to S1240 are the same as the processes to be performed at steps S1216 to S1224, and therefore description thereof will be omitted.

At step S1244, the ACK generator 140 of the base station 100 generates an ACK 2 and the transmission controller 150 performs the transmission process of the ACK 2. At step S1248, the reception controller 270 of the terminal 200 succeeds in the reception process of the ACK 2, and the operation ends.

FIG. 14 is a sequence diagram illustrating the operation corresponding to a case where "(B) receive only ACK 1" in FIG. 9 is selected. In FIG. 14, the processes related to the ACK 2 among the processes in FIG. 13 are not performed.

Otherwise, the processes in FIG. 14 are the same as those in FIG. 13, and therefore description thereof will be omitted.

FIG. 15 is a sequence diagram illustrating the operation corresponding to a case where "(C) receive only ACK 2" in FIG. 9 is selected. In FIG. 15, the processes related to the ACKs 1 among the processes in FIG. 13 are not performed. Otherwise, the processes in FIG. 15 are the same as those in FIG. 13, and therefore description thereof will be omitted.

FIG. 16 is a sequence diagram illustrating the operation corresponding to a case where "(A) receive no ACK" in FIG. 9 is selected. In FIG. 16, the processes related to the ACKs 1 and the ACK 2 among the processes in FIG. 13 are not performed. Otherwise, the processes in FIG. 16 are the same as those in FIG. 13, and therefore description thereof will be omitted.

2. Second Embodiment

The first embodiment of the present disclosure has been described above. The following describes a second embodiment of the present disclosure.

(2-1. Background)

First, background of the second embodiment will be described.

As described above, the base station 100 concurrently performs communication with a plurality of terminals 200. In other words, the maximum number of concurrent runs of each of the processes in the flowchart illustrated in FIG. 12 corresponds to the number of terminals 200. The transmission process of ACKs 1 or ACKs 2 to different terminals 200 may be performed at substantially the same time.

Note here that an upper limit of transmission power for each of frequencies to be used for the transmission process may be set by, for example, law or regulation. In such a case, it is necessary to restrict total transmission power to a level lower than or equal to the upper limit for the base station 100 to transmit ACKs to a plurality of terminals 200 using substantially the same frequency at substantially the same time. Restricting the total transmission power to a level lower than or equal to the upper limit reduces the maximum possible wireless ACK communication distance, increasing the possibility that the base station 100 fails in communication of the ACKs to the respective terminals 200.

In view of the above-described circumstances, the discloser of the present disclosure has devised the second embodiment. The following particularly describes differences from the first embodiment while omitting description of the same specifics as the first embodiment as much as possible.

(2-2. Overview of Functions)

The background of the second embodiment has been described above. The following describes an overview of functions of the second embodiment.

In a case where ACKs are to be transmitted to a plurality of terminals 200 using substantially the same frequency at substantially the same time, the base station 100 according to the second embodiment is able to preferentially transmit any of the ACKs.

For example, in a case where an ACK 1 and an ACK 2 are to be transmitted to different terminals 200 at substantially the same, the base station 100 preferentially transmits the ACK 2. More specifically, the ACK 1 is an ACK to be transmitted on a per-data frame basis for each of data frames provided through repeated transmission, and accordingly it is highly likely that the base station 100 has another chance to transmit the ACK 1 in the repeated transmission. By contrast, the ACK 2 is an ACK to be transmitted on a per-repeated transmission basis, and accordingly the base station 100 does not have another chance to transmit the ACK 2 in the repeated transmission. Furthermore, a terminal 200 having failed to receive the ACK 2 re-performs the entire repeated transmission. Not transmitting the ACK 2 therefore produces adverse effects such as an increase in power consumption, an increase in interference, and a reduction in communication efficiency. Transmitting the ACK 2 preferentially over the ACK 1 therefore enables the base station 100 to prevent these adverse effects.

Furthermore, in a case where ACKs 1 are to be respectively transmitted to different terminals 200 at substantially the same time, the base station 100 selects an ACK 1 to be preferentially transmitted on the basis of the following perspectives.

First, the base station 100 may select an ACK 1 to be preferentially transmitted on the basis of the reception situation with respect to data frames from the terminals 200. For example, the base station 100 may preferentially transmit an ACK 1 corresponding to a data frame from which higher power is received. Higher power being received from a data frame indicates that the terminal 200 that has transmitted the data frame is likely to be located closer to the base station 100. Selecting an ACK 1 to be preferentially transmitted on the basis of the power received from the data frames therefore enables the base station 100 to increase the probability of successful reception of the ACK 1 by the terminal 200. Alternatively, the base station 100 may preferentially transmit an ACK 1 corresponding to a terminal 200 that transmits data frames less frequently (in other words, a terminal 200 from which the base station 100 receives data frames less frequently). A terminal 200 that transmits data frames less frequently is expected to provide fewer chances for the base station 100 to transmit the ACK 1 through, for example, retransmission of a data frame. This approach enables the base station 100 to more reliably perform communication with the terminal 200 that transmits data frames less frequently.

Alternatively, the base station 100 may select an ACK 1 to be preferentially transmitted on the basis of the transmission situation with respect to ACKs. For example, the base station 100 may preferentially transmit an ACK 1 corresponding to a terminal 200 in which the transmission count with respect to ACKs 1 is smaller relative to data frames provided through repeated transmission. The base station 100 may keep receiving data frames through repeated transmission from a terminal 200 even after the base station 100 has transmitted an ACK 1 for the data frames. In such a case, it is highly likely that this terminal 200 is at a location where the terminal 200 is unable to receive the ACK 1. Selecting an ACK 1 to be preferentially transmitted on the basis of the transmission count with respect to ACKs 1 relative to data frames provided through repeated transmission therefore enables the base station 100 to increase the probability of successful reception of the ACK 1 by the terminal 200.

It should be noted that the base station 100 may select an ACK 1 to be preferentially transmitted by freely combining the above-described perspectives. Furthermore, the base station 100 may select an ACK 1 to be preferentially transmitted on the basis of other perspectives than those described above.

Furthermore, in a case where ACKs 2 are to be respectively transmitted to different terminals 200 at substantially the same time, the base station 100 selects an ACK 2 to be preferentially transmitted on the basis of the following perspectives.

First, the base station 100 may select an ACK 2 to be preferentially transmitted on the basis of the reception situation with respect to data frames from the terminals 200. For example, the base station 100 may preferentially transmit an ACK 2 corresponding to a data frame from which higher power is received. Higher power being received from a data frame indicates that the terminal 200 that has transmitted the data frame is likely to be located closer to the base station 100. Selecting an ACK 2 to be preferentially transmitted on the basis of the power received from the data frames therefore enables the base station 100 to increase the probability of successful reception of the ACK 2 by the terminal 200. Alternatively, the base station 100 may preferentially transmit an ACK 2 corresponding to a terminal 200 that transmits data frames less frequently (in other words, a terminal 200 from which the base station 100 receives data frames less frequently). A terminal 200 that transmits data frames less frequently is expected to provide fewer chances for the base station 100 to transmit the ACK 2 through, for example, retransmission of a data frame. This approach enables the base station 100 to more reliably perform communication with the terminal 200 that transmits data frames less frequently.

Alternatively, the base station 100 may select an ACK 2 to be preferentially transmitted on the basis of the transmission situation with respect to ACKs. For example, in a case where an ACK 1 or an ACK 2 is preferentially transmitted to a terminal 200, the base station 100 may preferentially transmit an ACK 2 to another terminal 200 to which no ACK 1 has been transmitted. This enables the base station 100 to reduce the possibility of occurrence of a terminal 200 to which neither an ACK 1 nor an ACK 2 is transmitted while maintaining fairness.

It should be noted that the base station 100 may select an ACK 1 to be preferentially transmitted by freely combining the above-described perspectives. Furthermore, the base station 100 may select an ACK 2 to be preferentially transmitted on the basis of other perspectives than those described above.

(2-3. Functional Configuration and Operation)

The overview of the functions of the second embodiment has been described above. The following describes a functional configuration and an operation of each of the devices according to the second embodiment.

The functional configuration of the base station 100 according to the second embodiment will be described. In a case where ACKs are to be respectively transmitted to different terminals 200 using substantially the same frequency at substantially the same time, the transmission controller 150 selects an ACK to be preferentially transmitted according to the above-described method and controls the transmission process of the ACK. The transmission controller 150 may also store information related to an untransmitted ACK and use the information in a subsequent ACK transmission process as described above (for example, the case where an ACK 2 is transmitted preferentially to a terminal 200 to which an ACK 1 has not been preferentially transmitted, or the like). It should be noted that the other functional configuration of the base station 100 and the functional configuration of the terminals 200 can be the same as those in the first embodiment, and therefore description thereof will be omitted.

Furthermore, the following describes the operation of the base station 100. In the ACK transmission process, the transmission controller 150 performs a process of determining whether or not ACKs are to be transmitted to a plurality of terminals 200 using substantially the same frequency at substantially the same time. In a case where ACKs are to be transmitted to a plurality of terminals 200 using substantially the same frequency at substantially the same time, the transmission controller 150 selects an ACK to be preferentially transmitted according to the above-described method and controls the transmission process of the ACK. It should be noted that the operation of the terminal 200 can be the same as that in the first embodiment, and therefore description thereof will be omitted.

3. Third Embodiment

The second embodiment of the present disclosure has been described above. The following describes a third embodiment of the present disclosure.

(3-1. Background)

First, background of the third embodiment will be described with reference to FIG. 17. It should be noted that the upper limit of the repeated transmission count is four in FIG. 17.

The following discusses a case where, as illustrated in FIG. 17, the base station 100 fails in the reception process of a data frame transmitted for the first time in repeated transmission (for example, where decoded data is determined to include an error on the basis of the CRC, which is written as "CRC NG" in FIG. 17), but succeeds in the reception process of a data frame transmitted for the second time (for example, where additive combination of the data frame transmitted for the first time and the data frame transmitted for the second time is successful, which is written as "CRC OK" in FIG. 17).

Upon succeeding in the reception process of the data frame transmitted for the second time, the base station 100 transmits an ACK 1. If the maximum possible communication distance for the ACK 1 is shorter than a communication distance corresponding to a gain resulting from the data frame transmission repeated twice, the terminal 200 is unable to receive the ACK 1. The terminal 200 failing to receive the ACK 1 therefore performs the transmission process of data frames up to four times, which is the upper limit of the repeated transmission count, and the base station 100 performs the reception process on all of the data frames. Thereafter, the terminal 200 recognizes that the base station 100 has succeeded in the reception process of the data frame by succeeding in the reception process of an ACK 2 transmitted by the base station 100.

Since the base station 100 has succeeded in the reception process of the data frame transmitted for the second time in the example illustrated in FIG. 17, communication of the data frames and the ACKs 1 for the third time and the fourth time can be considered redundant.

In view of the above-described circumstances, the discloser of the present disclosure has devised the third embodiment. The following particularly describes differences from the first embodiment while omitting description of the same specifics as the first embodiment as much as possible.

(3-2. Overview of Functions)

The background of the third embodiment has been described above. The following describes an overview of functions of the third embodiment.

Each of the terminals 200 according to the third embodiment is able to stop the transmission process of data frames before the repeated transmission count reaches the upper limit thereof in a case where it is determined that the base station 100 has succeeded in the reception process of a data frame.

For example, the terminal 200 may determine whether or not the base station 100 has succeeded in the reception process of a data frame on the basis of the past communication situation. For example, the base station 100 includes, in an ACK 2, information (referred to below as "RX-N") related to a repeated reception count in the past data frame reception process and transmits the ACK 2 to the terminal 200. The repeated reception count is the number of times data frame reception is repeated until the reception process is successfully completed (in other words, the number of data frames additively combined by the base station 100 until the reception process is successfully completed).

Now, an example of a frame configuration of the ACK 2 including the RX-N will be described with reference to FIG. 18. As illustrated in FIG. 18, the DL MAC Header of the ACK 2 includes the RX-N and the ID, which is identification information of the terminal 200 being a destination of the ACK 2.

The terminal 200 then recognizes the RX-N in the past communication situation by receiving the ACK 2 and determines whether or not the base station 100 has succeeded in the reception process of the data frame on the basis of the RX-N. For example, the terminal 200 may determine that the base station 100 has succeeded in the reception process of the data frame on the condition that transmission has been repeated a number of times that is equal to the RX-N corresponding to the last repeated transmission, and stop the transmission process for the subsequent data frames.

This enables the base station 100 and the terminal 200 to reduce waste of communication of a data frame and an ACK 1 while maintaining a low possibility of the data frame reception process resulting in failure.

It should be noted that the method for performing the process is not limited to the above-described example. For example, the terminal 200 may further ensure that the data frame reception process is successfully completed by repeating the process a number of times that is greater than the RX-N. Furthermore, the terminal 200 may increase the repeated transmission count at which the transmission process is stopped or set the repeated transmission count to the upper limit in a case where the terminal 200 is unable to receive the ACK 2 including the RX-N. The method for notifying the terminal 200 of the RX-N is not limited to the method in which the RX-N is stored in the ACK 2.

(3-3. Functional Configuration)

The overview of the functions of the third embodiment has been described above. The following describes a functional configuration of each of the devices according to the third embodiment.

The functional configuration of the base station 100 will be described. The reception controller 120 provides the RX-N to the ACK generator 140, and the ACK generator 140 generates the ACK 2 including the RX-N. The other features of the functional configuration can be the same as those in the first embodiment, and therefore description thereof will be omitted.

The functional configuration of the terminal 200 will be described. Upon receiving the ACK 2, the reception controller 270 provides the RX-N included in the ACK 2 to the transmission controller 240, and the transmission controller 240 controls the repeated transmission count on the basis of the RX-N. The other features of the functional configuration can be the same as those in the first embodiment, and therefore description thereof will be omitted.

4. Fourth Embodiment

The third embodiment of the present disclosure has been described above. The following describes a fourth embodiment of the present disclosure.

(4-1. Background)

First, background of the fourth embodiment will be described.

In FIG. 3 described previously, the upper limit of the repeated transmission count is four. Accordingly, as illustrated in FIG. 3, the terminal 200B performs the reception process of the ACK 1 and the reception process of the subsequently transmitted ACK 2 after the data frame has been transmitted for the fourth time. The terminal 200B only have to succeed in the reception process of either the ACK 1 or the ACK 2. That is, it is redundant to perform both the reception process of the ACK 1 and the reception process of the ACK 2.

In view of the above-described circumstances, the discloser of the present disclosure has devised the fourth embodiment. The following particularly describes differences from the first embodiment while omitting description of the same specifics as the first embodiment as much as possible.

(4-2. Overview of Functions)

The background of the fourth embodiment has been described above. The following describes an overview of functions of the fourth embodiment.

The base station 100 according to the fourth embodiment omits control of transmission of an ACK 1 corresponding to the last reception process and performs only control of transmission of an ACK 2 after performing the data frame reception process until the repeated transmission count reaches the upper limit thereof. This enables the base station 100 and the terminal 200 to omit communication of the ACK 1, and thus reduce power consumption.

(4-3. Functional Configuration and Operation)

The overview of the functions of the fourth embodiment has been described above. The following describes a functional configuration and an operation of each of the devices according to the fourth embodiment.

The functional configuration of the base station 100 will be described. Upon the data frame reception process being successfully completed, the ACK generator 140 confirms whether or not the data frame reception process has been performed until the repeated transmission count has reached the upper limit thereof. In a case where the data frame reception process has been performed until the repeated transmission count has reached the upper limit thereof, the ACK generator 140 omits control of generation of an ACK 1 corresponding to the last reception process and performs only control of generation of an ACK 2. The other features of the functional configuration can be the same as those in the first embodiment, and therefore description thereof will be omitted.

The functional configuration of the terminal 200 will be described. The reception controller 270 omits control of reception of the ACK 1 corresponding to the last reception process and performs only control of reception of the ACK 2 on the basis of information related to the repeated transmission count and the transmission timing provided by the transmission controller 240. The other features of the functional configuration can be the same as those in the first embodiment, and therefore description thereof will be omitted.

The following describes the operation of the terminal 200 with reference to FIG. 19. Steps S1600 to S1612 are the same as steps S1000 to S1012 in FIG. 11, and therefore description thereof will be omitted.

At step S1616, the reception controller 270 confirms whether or not the repeated transmission count has reached the upper limit thereof. In a case where the repeated transmission count has not reached the upper limit thereof (No at step S1616), the reception controller 270 controls reception of an ACK 1 at steps S1620 and S1624. In a case where the repeated transmission count has reached the upper limit thereof (Yes at step S1616), the reception controller 270 controls reception of an ACK 2 at steps S1628 and S1632.

The following describes the operation of the base station 100 with reference to FIG. 20. Steps S1700 to S1716 are the same as steps S1100 to S1116 in FIG. 12, and therefore description thereof will be omitted.

At step S1720, the reception controller 120 determines whether or not decoding of a data frame is successful by performing processing related to the CRC included in the data frame. In a case where the reception controller 120 determines that the decoding of the data frame is successful (Yes at step S1720), the ACK generator 140 confirms whether or not the data frame reception process has been performed until the repeated transmission count has reached the upper limit thereof at step S1724. In a case where the data frame reception process has not been performed until the repeated transmission count has reached the upper limit thereof (No at step S1724), the ACK generator 140 performs control of generation of an ACK 1 at steps S1728 and S1732. In a case where the data frame reception process has been performed until the repeated transmission count has reached the upper limit thereof (Yes at step S1724), the ACK generator 140 performs control of generation of an ACK 2 at steps S1736 and S1740.

It should be noted that steps S1744 to S1760 are the same as steps S1144 to S1160 in FIG. 12, and therefore description thereof will be omitted.

The following describes a sequence diagram illustrating the operation of the terminal 200 and the base station 100 with reference to FIG. 21. FIG. 21 is a sequence diagram illustrating the operation according to the case where "(D) receive ACK 1 and ACK 2" in FIG. 9 is selected. It should be noted that the upper limit of the repeated transmission count is two in FIG. 21, for descriptive purposes. In FIG. 21, the terminal 200 fails to detect an ACK 1, and thus the reception process of the ACK 1 is unsuccessful (that is, the ACK 1 is transmitted until the repeated transmission count reaches the upper limit thereof).

Processes to be performed at steps S1800 to S1812 are the same as the processes to be performed at steps S1200 to S1212 in FIG. 13, and therefore description thereof will be omitted. Upon the ACK generator 140 confirming that the data frame reception process has not been performed until the repeated transmission count has reached the upper limit thereof after the reception controller 120 of the base station 100 succeeding in the reception process of a data frame transmitted from the terminal 200 at step S1816, the ACK generator 140 generates an ACK 1 and the transmission controller 150 performs the transmission process of the ACK 1 at step S1820.

Processes to be performed at steps S1824 and S1828 are the same as the processes to be performed at steps S1224 and S1228 in FIG. 13, and therefore description thereof will be omitted. Upon the ACK generator 140 confirming that the data frame reception process has been performed until the repeated transmission count has reached the upper limit thereof after the reception controller 120 of the base station 100 succeeding in the reception process of a data frame transmitted from the terminal 200 at step S1832, the ACK generator 140 generates an ACK 2 rather than an ACK 1 and the transmission controller 150 performs the transmission process of the ACK 2 at step S1836. At step S1840, the reception controller 270 of the terminal 200 succeeds in the reception process of the ACK 2, and the operation ends.

5. Fifth Embodiment

The fourth embodiment of the present disclosure has been described above. The following describes a fifth embodiment of the present disclosure.

(5-1. Background)

First, background of the fifth embodiment will be described.

In the above-described embodiments, the base station 100 stores the destination information (for example, ID, or the like) in the DL MAC Header of an ACK 1 and an ACK 2. Upon receiving these signals, the terminal 200 compares the identification information thereof with the destination information in the DL MAC Header and determines whether or not the signals are addressed to the own device. Note here that the frame length of the ACK 1 and the frame length of the ACK 2 are preferably short in terms of reduction in power necessary for the reception process of the ACK 1 and the ACK 2 by the terminal 200.

In view of the above-described circumstances, the discloser of the present disclosure has devised the fifth embodiment. The following particularly describes differences from the first embodiment while omitting description of the same specifics as the first embodiment as much as possible.

(5-2. Overview of Functions)

The background of the fifth embodiment has been described above. The following describes an overview of functions of the fifth embodiment.

When generating an ACK 1 and an ACK 2, the base station 100 according to the fifth embodiment generates these signals such that the DL MAC Header and the CRC are omitted and only the Preamble unique to each terminal 200 is included, the Preamble being generated on the basis of the identification information (for example, ID, or the like) of the terminal 200 being a destination.

Note here that no particular limitations are placed on a method for generating the Preamble unique to each terminal 200. For example, the base station 100 may generate the Preamble by inputting the identification information of the terminal 200 to a PN sequence generator, which is a type of pseudo-random sequence generators. Furthermore, the base station 100 may maintain a table in which the identification information of each of the terminals 200 is associated with a Preamble unique to each terminal 200, and set the Preamble on the basis of the table.

In such a case, each of the terminals 200 may generate a Preamble unique to the own device according to the same method as the base station 100 (or grasp a Preamble unique to the own device in advance), so that the terminal 200 can detect the ACK 1 and the ACK 2.

According to the fifth embodiment, as described above, it is possible to reduce the reception time taken to receive the ACK 1 and the ACK 2, and reduce power necessary for the reception process by setting the ACK 1 and the ACK 2 to a short frame length while maintaining conditions that allow the terminal 200 to detect these signals appropriately.

(5-3. Functional Configuration)

The overview of the functions of the fifth embodiment has been described above. The following describes a functional configuration of each of the devices according to the fifth embodiment.

With reference to FIG. 22, the functional configuration of the base station 100 that generates the Preamble of an ACK 1 and an ACK 2 using a PN sequence generator will be described. FIG. 22 is a diagram illustrating an example of the PN sequence generator. The PN sequence generator includes six delay elements 10 and two exclusive OR circuits 20.

The ACK generator 140 of the base station 100 for example generates the Preamble unique to each terminal 200 being a destination of an ACK by inputting the ID of the terminal 200 as an initial value of the PN sequence generator, which in other words is an initial value of each of the delay elements 10, illustrated in FIG. 22.

The functional configuration of the terminal 200 will be described. When receiving an ACK, the reception controller 270 generates the same Preamble as that created by the base station 100 by inputting the ID of the own device as an initial value of the PN sequence generator illustrated in FIG. 22, and uses the thus generated Preamble in the reception process of the ACK.

It should be noted that when an ACK 1 and an ACK 2 are generated, different PN sequence generators may be used, so that different Preambles are respectively used for the ACK 1 and the ACK 2. For example, when an ACK 1 and an ACK 2 are generated, PN sequence generators different in the number of delay elements 10 may be used, or PN sequence generators different in arrangement of the exclusive OR circuits 20 may be used. Furthermore, other sequence generators such as an M sequence generator or a Gold sequence generator may be used as the pseudo-random sequence generator.

(5-4. Modification Example)

The functional configuration of each of the devices according to the fifth embodiment has been described above. The following describes a modification example of the fifth embodiment.

According to the fifth embodiment, it is necessary for each of the terminals 200 to calculate, upon receiving an ACK addressed to another terminal 200, a correlation value between the Preamble of the ACK and the Preamble of the own device, and recognize that the ACK is not a signal addressed to the own device on the basis of the fact that the correlation value is not greater than a predetermined value (the correlation value is small enough).

Note here that in a case where the Preambles are generated using sufficiently long sequences generated by the PN sequence generator in FIG. 22, the correlation value between the Preambles generated using different IDs is small enough, allowing the terminal 200 to appropriately determine whether or not the ACK is a signal addressed to the own device. However, since an ACK 1 is not allowed to have a longer frame length than an ACK 2, the Preamble thereof may be generated using only a portion of a sequence generated by the PN sequence generator. In such a case, the terminal 200 may misdetect the ACK 1 due to the fact that the correlation value between the Preambles generated using the different IDs is greater than the predetermined value (the correlation value is not small enough).

In view of the above-described circumstances, the discloser of the present disclosure has devised the modification example of the fifth embodiment. When generating an ACK 1, the base station 100 according to the present modification example generates the Preamble on the basis of the ID of the terminal 200, and also decides the transmission timing of the ACK 1. More specifically, the base station 100 generates the Preamble of the ACK 1 by inputting a portion of the ID of the terminal 200 being a destination to the PN sequence generator or the like illustrated in FIG. 22 and decides the transmission timing of the ACK 1 using a portion of the ID of the terminal 200.

Now, a Preamble generation method and a transmission timing generation method according to the modification example will be described in more detail with reference to FIGS. 23 and 24. It should be noted that the ID of the terminal 200 includes 8 [bits] in FIG. 23.

The base station 100 for example generates the Preamble of an ACK 1 by inputting the 0th [bit] to the 3rd [bit] of the ID of the terminal 200 to the PN sequence generator or the like illustrated in FIG. 22. The base station 100 then outputs the transmission timing (written as "dT" in FIG. 23) of the ACK 1 by inputting the 4th [bit] to the 7th [bit] of the ID to a specific program. As illustrated in FIG. 24, the transmission timing of the ACK 1 as used herein refers to a period of time from an end of a data frame (written as "UL Data frame" in FIG. 24) transmitted by the terminal 200 to the transmission of the ACK 1. Furthermore, no particular limitations are placed on the content of the specific program to be used for outputting the transmission timing of the ACK 1, and any programs may be used as long as a certain time-related value can be outputted on the basis of the inputted ID. Furthermore, any portion of the ID may be used for the above-described process.

As illustrated in FIG. 24, a transmission timing (dT1) of the ACK 1 to the terminal 200A and a transmission timing (dT2) of an ACK 1 to the terminal 200B are different from each other as a result of the transmission timings of the ACKs 1 being decided on the basis of the IDs of the respective terminals 200.

Each of the terminals 200 then generates the Preamble for detection of the ACK 1 according to the same method as the base station 100 and calculates a reception timing of the ACK 1 (corresponding to the above-described transmission timing). This enables the terminal 200 to determine whether or not the ACK 1 is a signal addressed to the own device on the basis of the reception timing of the ACK 1 as well as the Preamble. That is, even if the correlation value between the Preambles generated on the basis of the different IDs is greater than the predetermined value (the correlation value is not small enough), each of the terminals 200 is able to prevent misdetection of the ACK 1 on the basis of the reception timing of the ACK 1.

6. Sixth Embodiment

The fifth embodiment of the present disclosure has been described above. The following describes a sixth embodiment of the present disclosure.

(6-1. Background)

First, background of the sixth embodiment will be described.

As described above, the wireless communication system includes a large number of terminals 200. In a case where the base station 100 receives a data frame from a terminal 200 and transmits an ACK for the data frame, the transmission process of the ACK and the reception process of a data frame from a different terminal 200 may occur at the same time.

Note here that in a case where the base station 100 is allowed to perform only one of either the transmission process or the reception process if the frequency to be used for the transmission process of the ACK and the frequency to be used for the reception process of the data frame are substantially the same, the base station 100 is unable to perform the reception process of the data frame from the different terminal 200 during the transmission process of the ACK. In a case where the base station 100 is allowed to perform the transmission process and the reception process at the same time, the base station 100 may fail in the reception process of the data frame from the different terminal 200 due to interference between the ACK and the data frame.

Examples of methods for dealing with such an event include a technique referred to as FDD (Frequency Division Duplex), which uses different frequencies for transmission and reception. A general FDD method achieves different frequencies for transmission and reception by defining a pair (one-to-one) of a frequency to be used for the reception process and a frequency to be used for the transmission process. Even if transmission and reception occur at the same time, therefore, it is possible to reduce the influence on each other.

However, even if the FDD is applied, the base station 100 may succeed in the reception process of data frames from a plurality of terminals 200 using substantially the same frequency at substantially the same time. For example, the data frames may be spread using a pseudo-random sequence (for example, a PN sequence, or the like) as described in association with the first embodiment. In such a case, the base station 100 may succeed in the reception process of these data frames because of spreading gain even if the data frames from the plurality of terminals 200 reach the base station 100 using substantially the same frequency at substantially the same time.

In such a case, application of the FDD causes the base station 100 to use substantially the same frequency for the transmission process of ACKs to the different terminals 200 since substantially the same frequency has been used for the reception process. For example, in a case where the upper limit of transmission power for each of frequencies to be used for the transmission process is set by, for example, law or regulation, it is necessary to restrict total transmission power to a level lower than or equal to the upper limit for the base station 100 to transmit the ACKs to the plurality of terminals 200 using substantially the same frequency at substantially the same time. Restricting the total transmission power to a level lower than or equal to the upper limit reduces the wireless ACK communication distance, increasing the possibility that the base station 100 fails in the communication of the ACKs to the respective terminals 200.

In view of the above-described circumstances, the discloser of the present disclosure has devised the sixth embodiment. The following particularly describes differences from the first embodiment while omitting description of the same specifics as the first embodiment as much as possible.

(6-2. Overview of Functions)

The background of the sixth embodiment has been described above. The following describes an overview of functions of the sixth embodiment.

The base station 100 according to the sixth embodiment is able to decide a frequency to be used for the transmission process of an ACK on the basis of the frequency used for the reception process and the identification information (for example, ID, or the like) of the terminal 200.

More specifically, first, frequencies to be used for the reception process are given frequency numbers corresponding to the respective frequencies as illustrated in FIG. 25. Likewise, frequencies to be used for the transmission process are also given frequency numbers corresponding to the respective frequencies as illustrated in FIG. 26. Then, the base station 100 is able to decide F_TX, which is the frequency number corresponding to the frequency to be used for the transmission process of an ACK, in accordance with the following Expression 2, where F_RX represents the frequency number corresponding to a frequency used for the reception process of a data frame, ID represents the identification information of the terminal 200 being a destination of the ACK, and N-TXF represents the quantity of frequencies usable for the transmission process by the base station 100, for example. It should be noted that mod is an operator representing a remainder of a division. For example, (A) mod(B) represents a remainder of a division of A by B.

[Math. 2]

$$F\_TX = (F\_RX + ID) \bmod (N\_TXF) \quad \text{(Expression 2)}$$

The following accordingly discusses a case where the base station 100 receives data frames from different terminals 200 respectively having the identification information "11" (ID=11) and the identification information "20" (ID=20) using a frequency corresponding to the frequency number "2" (F_RX=2) at substantially the same time, and the reception process of both of the data frames is successfully completed, for example. F_TX=3 and F_TX=2 are calculated in accordance with Expression 2, where the quantity of frequencies usable for the transmission process by the base station 100 is "10" (N-TXF=10).

As described above, even if the reception process of data frames from a plurality of terminals 200 is successfully completed using the substantially the same frequency at substantially the same time, it is possible for the base station 100 to increase the probability of successful communication of ACKs by using different frequencies for the transmission process of the respective ACKs to the respective terminals 200.

It should be noted that the expression for calculating the F_TX is not limited to Expression 2. For example, the expression for calculating the F_TX can be changed as appropriate depending on a factor such as a method for defining the identification information of the terminals 200 or the quantity of frequencies (N-TXF) usable for the transmission process by the base station 100. Furthermore, the expression for calculating the F_TX may be an expression in which the N-TXF is not used.

Furthermore, when receiving the ACKs after having transmitted the data frames, the terminals 200 are able to succeed in the reception process of the ACKs by deciding the frequencies to be used for the reception process in accordance with Expression 2 described above, as in the case of the base station 100.

(6-3. Functional Configuration)

The overview of the functions of the sixth embodiment has been described above. The following describes a functional configuration of each of the devices according to the sixth embodiment.

The functional configuration of the base station 100 will be described. Upon succeeding in the reception process of a data frame, the reception controller 120 provides the F_RX and the ID to the transmission controller 150. The transmission controller 150 then calculates the F_TX by substituting the provided information and the N-TXF into Expression 2 described above, and performs the transmission process of an ACK using a frequency corresponding to the F_TX.

The functional configuration of the terminal 200 will be described. The transmission controller 240 provides the frequency number corresponding to the frequency used for the transmission process of the data frame (the frequency number corresponding to the F_RX in the base station 100) to the reception controller 270. Then, the reception controller 270 calculates the frequency number corresponding to a frequency to be used for the reception process of the ACK (the frequency number corresponding to the F_RX in the base station 100) by substituting the provided information, the ID of the own device, and the N-TXF into Expression 2 described above, and performs the reception process of the ACK using the frequency corresponding to the calculated frequency number.

7. Conclusion

As described above, according to the first embodiment of the present disclosure, it is possible to achieve a reduction in power consumption by wireless communication devices, a reduction in impact of interference, and a reduction in the number of base stations at the same time by using an ACK 1, which is transmitted on a per-data frame basis for each of data frames provided through repeated transmission, and an ACK 2, which is transmitted on a per-repeated transmission basis.

Furthermore, in a case where a plurality of ACKs is to be transmitted to a plurality of terminals 200 using substantially the same frequency at substantially the same time, the base station 100 according to the second embodiment of the present disclosure is able to preferentially transmit any of the ACKs. This for example enables the base station 100 to increase the probability of successful reception of an ACK 1 by a terminal 200.

Furthermore, each of the terminals 200 according to the third embodiment of the present disclosure is able to stop the transmission process of data frames before the repeated transmission count reaches the upper limit thereof in a case where it is determined that the base station 100 has succeeded in the reception process of a data frame. This enables the terminal 200 to reduce waste of communication of a data frame and an ACK 1 while maintaining a low possibility of the data frame reception process resulting in failure.

Furthermore, the base station 100 according to the fourth embodiment of the present disclosure omits control of transmission of an ACK 1 corresponding to the last reception process and performs only control of transmission of an ACK 2 after performing the data frame reception process until the repeated transmission count reaches the upper limit thereof. This enables the base station 100 to omit communication of the ACK 1, and thus reduce power consumption.

Furthermore, when generating an ACK 1 and an ACK 2, the base station 100 according to the fifth embodiment of the present disclosure generates these signals such that the DL MAC Header and the CRC are omitted and only the Preamble unique to each terminal 200 is included, the Preamble being generated on the basis of the identification information (for example, ID, or the like) of the terminal 200 being a destination. This enables the base station 100 to reduce the reception time taken to receive the ACK 1 and the ACK 2, and reduce power necessary for the reception process by setting the ACK 1 and the ACK 2 to a short frame length while maintaining conditions that allow the terminal 200 to detect these signals appropriately.

Furthermore, when generating an ACK 1, the base station 100 according to the modification example of the fifth embodiment generates the Preamble on the basis of the ID of the terminal 200, and also decides the transmission timing of the ACK 1. This enables the base station 100 to effectively prevent misdetection of the ACK 1 by another terminal 200.

Lastly, the base station 100 according to a modification example of the sixth embodiment is able to decide a frequency to be used for the transmission process of an ACK on the basis of the frequency used for the reception process and the identification information (for example, ID, or the like) of the terminal 200. This enables the base station 100 to increase, even if the reception process of data frames from a plurality of terminals 200 is successfully completed using the substantially the same frequency at substantially the same time, the probability of successful communication of ACKs by using different frequencies for the transmission process of the respective ACKs to the respective terminals 200.

A preferred embodiment(s) of the present disclosure has/have been described above in detail with reference to the accompanying drawings, but the technical scope of the present disclosure is not limited to such an example(s). It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

For example, the steps in an operation of each of the devices do not necessarily have to be performed along a timeline according to the order illustrated as the corresponding flowchart. That is, each of the steps in an operation of the base station 100 or the terminal 200 may be performed according to an order different from the order illustrated as the corresponding flowchart or may be performed concurrently with another step.

Furthermore, the effects described herein are merely illustrative and exemplary, and not limiting. That is, the technique according to the present disclosure can exert other effects that are apparent to those skilled in the art from the description herein, in addition to the above-described effects or in place of the above-described effects.

It should be noted that the following configurations are also fall within the technical scope of the present disclosure.

(1)

A wireless communication device including:

a reception controller that controls reception of a plurality of data frames provided by another device through repeated transmission, the plurality of data frames including the same data; and a transmission controller that controls transmission of a confirmation response signal to the other device on a per-data frame basis, on a per-repeated transmission basis, or both.

(2)

The wireless communication device according to (1), in which a first confirmation response signal that is transmitted on a per-data frame basis and a second confirmation response signal that is transmitted on a per-repeated transmission basis have frame lengths different from each other.

(3)

The wireless communication device according to (2), in which the first confirmation response signal has a shorter frame length than the second confirmation response signal.

(4)

The wireless communication device according to any one of (1) to (3), in which, in a case where a plurality of confirmation response signals is to be transmitted at substantially the same time, the transmission controller preferentially transmits any of the plurality of confirmation response signals.

(5)

The wireless communication device according to (4), in which, in a case where a first confirmation response signal and a second confirmation response signal are to be transmitted at substantially the same time, the transmission controller preferentially transmits the second confirmation response signal, the first confirmation response signal being transmitted on a per-data frame basis, the second confirmation response signal being transmitted on a per-repeated transmission basis.

(6)

The wireless communication device according to (4) or (5), in which the transmission controller preferentially transmits any of the plurality of confirmation response signals on a basis of a reception situation with respect to the data frames or a transmission situation with respect to the confirmation response signal.

(7)

The wireless communication device according to any one of (1) to (6), in which the transmission controller controls transmission of a signal including information related to a number of times the reception controller repeatedly received the data frames until a reception process of the data frames is successfully completed.

(8)

The wireless communication device according to any one of (1) to (7), in which the transmission controller does not transmit a first confirmation response signal corresponding to the data frame lastly transmitted in the repeated transmission.

(9)

The wireless communication device according to any one of (1) to (8), in which the transmission controller decides a preamble of the confirmation response signal on a basis of identification information of the other device.

(10)

The wireless communication device according to any one of (1) to (9), in which the transmission controller decides a frequency for transmitting the confirmation response signal on a basis of a frequency for receiving the data frames and identification information of the other device.

(11)

A wireless communication method executed by a computer, the method including:

controlling reception of a plurality of data frames provided by another device through repeated transmission, the plurality of data frames including the same data; and controlling transmission of a confirmation response signal to the other device on a per-data frame basis, on a per-repeated transmission basis, or both.

(12)

A wireless communication device including:

a transmission controller that controls repeated transmission for providing a plurality of data frames to another device, the plurality of data frames including the same data; and a reception controller that controls reception of a confirmation response signal from the other device on a per-data frame basis, on a per-repeated transmission basis, or both.

(13)

The wireless communication device according to (12), in which a first confirmation response signal that is received on a per-data frame basis and a second confirmation response signal that is received on a per-repeated transmission basis have frame lengths different from each other.

(14)

The wireless communication device according to (13), in which the first confirmation response signal has a shorter frame length than the second confirmation response signal.

(15)

The wireless communication device according to any one of (12) to (14), in which the reception controller controls reception of a signal including information related to a number of times the other device repeatedly received the data frames until a reception process of the data frames is successfully completed, and the transmission controller decides a transmission count in the repeated transmission on a basis of the information.

(16)

The wireless communication device according to any one of (12) to (15), in which the reception controller does not receive a first confirmation response signal transmitted corresponding to the data frame lastly transmitted in the repeated transmission.

(17)

The wireless communication device according to any one of (12) to (16), in which the reception controller decides a preamble to be used for detection of the confirmation response signal on a basis of identification information of an own device.

(18)

The wireless communication device according to any one of (12) to (17), in which the reception controller decides a frequency for receiving the confirmation response signal on a basis of a frequency for transmitting the data frames and identification information of an own device.

(19)

A wireless communication method executed by a computer, the method including:

controlling repeated transmission for providing a plurality of data frames to another device, the plurality of data frames including the same data; and controlling reception of a confirmation response signal from the other device on a per-data frame basis, on a per-repeated transmission basis, or both.

(20)

A wireless communication system including:

a first wireless communication device; and
a second wireless communication device,
the first wireless communication device including
a first reception controller that controls reception of a plurality of data frames provided by the second wireless communication device through repeated transmission, the plurality of data frames including the same data, and
a first transmission controller that controls transmission of a confirmation response signal to the second wireless communication device on a per-data frame basis, on a per-repeated transmission basis, or both,
the second wireless communication device including
a second transmission controller that controls the repeated transmission for providing the data frames to the first wireless communication device, and
a second reception controller that controls reception of the confirmation response signal from the first wireless communication device on a per-data frame basis, on a per-repeated transmission basis, or both.

REFERENCE SIGNS LIST

100: Base station
110: Reception section
120: Reception controller
130: Sensor information acquisition section
140: ACK generator
150: Transmission controller
160: Transmission section
200: Terminal
210: Sensor information acquisition section
220: Mode selector
230: Data frame generator 240: Transmission controller
250: Transmission section
260: Reception section
270: Reception controller

The invention claimed is:

1. A wireless communication device, comprising:
a reception controller configured to control reception of a plurality of data frames, wherein
the plurality of data frames is transmitted by an external device through repeated transmission, and
the plurality of data frames includes the same data; and
a transmission controller configured to control transmission of a confirmation response signal, including at least one of a first confirmation response signal or a second confirmation response signal, to the external device based on a distance between the wireless communication device and the external device, wherein
the first confirmation response signal of a first frame length is transmitted for each data frame of the plurality of data frames in a case where the distance between the wireless communication device and the external device is less than a threshold distance,
the second confirmation response signal of a second frame length longer than the first frame length is transmitted subsequent to the transmission of the first confirmation response signal in a case where the distance between the wireless communication device and the external device is greater than the threshold distance, and
the second confirmation response signal is transmitted after a transmission count of the repeated transmission has reached an upper limit.

2. The wireless communication device according to claim 1, wherein, in a case where a plurality of confirmation response signals is to be transmitted at substantially the same time, the transmission controller is further configured to transmit one of the plurality of confirmation response signals.

3. The wireless communication device according to claim 2, wherein, in a case where the first confirmation response signal and the second confirmation response signal are to be transmitted at substantially the same time, the transmission controller is further configured to transmit the second confirmation response signal.

4. The wireless communication device according to claim 2, wherein the transmission controller is further configured to transmit one of the plurality of confirmation response signals based on one of a reception situation with respect to the plurality of data frames or a transmission situation with respect to the plurality of confirmation response signals.

5. The wireless communication device according to claim 1, wherein
the transmission controller is further configured to control transmission of a signal, and
the signal includes information related to a number of times the reception controller repeatedly received the plurality of data frames until a reception process of the plurality of data frames is completed.

6. The wireless communication device according to claim 1, wherein the transmission controller is further configured to:
transmit the first confirmation response signal corresponding to a first data frame of the plurality of data frames at a first timing; and
transmit the first confirmation response signal corresponding to a second data frame of the plurality of data frames at a second timing after the first timing in the repeated transmission, wherein the second data frame is different from the first data frame.

7. The wireless communication device according to claim 1, wherein the transmission controller is further configured to determine a preamble of the confirmation response signal based on identification information of the external device.

8. The wireless communication device according to claim 1, wherein the transmission controller is further configured to determine a frequency for the transmission of the confirmation response signal based on a frequency of the reception of the plurality of data frames and identification information of the external device.

9. A wireless communication method, comprising:
in a wireless communication device:
controlling reception of a plurality of data frames, wherein
the plurality of data frames is transmitted by an external device through repeated transmission, and
the plurality of data frames includes the same data; and
controlling transmission of a confirmation response signal, including at least one of a first confirmation response signal or a second confirmation response signal, to the external device based on a distance between the wireless communication device and the external device, wherein
the first confirmation response signal of a first frame length is transmitted for each data frame of the plurality of data frames in a case where the distance between the wireless communication device and the external device is less than a threshold distance,
the second confirmation response signal of a second frame length longer than the first frame length is transmitted subsequent to the transmission of the first confirmation response signal in a case where the distance between the wireless communication device and the external device is greater than the threshold distance, and
the second confirmation response signal is transmitted after a transmission count of the repeated transmission has reached an upper limit.

10. A wireless communication device, comprising:
a transmission controller configured to control repeated transmission of a plurality of data frames to an external device, wherein the plurality of data frames includes the same data; and
a reception controller configured to control reception of a confirmation response signal, including at least one of a first confirmation response signal or a second confirmation response signal, from the external device based on a distance between the wireless communication device and the external device, wherein
the first confirmation response signal of a first frame length is received for each data frame of the plurality of data frames in a case where the distance between the wireless communication device and the external device is less than a threshold distance,
the second confirmation response signal of a second frame length longer than the first frame length is received subsequent to the first confirmation response signal in a case where the distance between the wireless communication device and the external device is greater than the threshold distance, and the second confirmation response signal is received after a transmission count of the repeated transmission has reached an upper limit.

11. The wireless communication device according to claim 10, wherein
the reception controller is further configured to control reception of a signal,
the signal includes information related to a number of times the external device repeatedly received the plurality of data frames until a reception process of the plurality of data frames is completed, and
the transmission controller is further configured to determine the transmission count in the repeated transmission based on the information.

12. The wireless communication device according to claim 10, wherein the reception controller is further configured to:
receive the first confirmation response signal corresponding to a first data frame of the plurality of data frames at a first timing; and
transmit the first confirmation response signal corresponding to a second data frame of the plurality of data frames at a second timing after the first timing in the repeated transmission, wherein the second data frame is different from the first data frame.

13. The wireless communication device according to claim 10, wherein the reception controller is further configured to determine a preamble to be used for detection of the confirmation response signal based on identification information of the wireless communication device.

14. The wireless communication device according to claim 10, wherein the reception controller is further configured to determine a frequency for the reception of the confirmation response signal based on a frequency of the transmission of the plurality of data frames and identification information of the wireless communication device.

15. A wireless communication method, comprising:
in a wireless communication device:
controlling repeated transmission of a plurality of data frames to an external device, wherein the plurality of data frames includes the same data; and
controlling reception of a confirmation response signal, including at least one of a first confirmation response signal or a second confirmation response signal, from the external device based on a distance between the wireless communication device and the external device, wherein
the first confirmation response signal of a first frame length is received for each data frame of the plurality of data frames in a case where the distance between the wireless communication device and the external device is less than a threshold distance,
the second confirmation response signal of a second frame length longer than the first frame length is received subsequent to the first confirmation response signal in a case where the distance between the wireless communication device and the external device is greater than the threshold distance, and
the second confirmation response signal is received after a transmission count of the repeated transmission has reached an upper limit.

16. A wireless communication system, comprising:
a first wireless communication device; and
a second wireless communication device, wherein
the first wireless communication device includes:
a first reception controller configured to control reception of a plurality of data frames, wherein
the plurality of data frames is transmitted by the second wireless communication device through repeated transmission, and
the plurality of data frames includes the same data; and
a first transmission controller configured to control transmission of a confirmation response signal, including at least one of a first confirmation response signal or a second confirmation response signal, to the second wireless communication device based on a distance between the first wireless communication device and the second wireless communication device, wherein
the first confirmation response signal of a first frame length is transmitted for each data frame of the plurality of data frames in a case where the distance between the first wireless communication device and the second wireless communication device is less than a threshold distance,
the second confirmation response signal of a second frame length longer than the first frame length is transmitted subsequent to the transmission of the first confirmation response signal in a case where the distance between the first wireless communication device and the second wireless communication device is greater than the threshold distance, and
the second confirmation response signal is transmitted after a transmission count of the repeated transmission has reached an upper limit, and
the second wireless communication device includes:
a second transmission controller configured to control the repeated transmission of the plurality of data frames to the first wireless communication device; and
a second reception controller configured to control reception of the confirmation response signal from the first wireless communication device.

* * * * *